(12) United States Patent
Otsuka

(10) Patent No.: US 12,101,751 B2
(45) Date of Patent: Sep. 24, 2024

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Masaki Otsuka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 493 days.

(21) Appl. No.: 17/340,220

(22) Filed: Jun. 7, 2021

(65) Prior Publication Data

US 2021/0298023 A1  Sep. 23, 2021

Related U.S. Application Data

(63) Continuation of application No. PCT/JP2019/046605, filed on Nov. 28, 2019.

(30) Foreign Application Priority Data

Dec. 28, 2018  (JP) ................................. 2018-248375

(51) Int. Cl.
*H04W 72/0446* (2023.01)
*H04W 72/0453* (2023.01)
(Continued)

(52) U.S. Cl.
CPC ... *H04W 72/0453* (2013.01); *H04W 72/0446* (2013.01); *H04L 67/104* (2013.01);
(Continued)

(58) Field of Classification Search
CPC ......... H04B 7/0404; H04B 1/713; H04L 1/08; H04L 1/1816; H04L 1/1887;
(Continued)

(56) References Cited

U.S. PATENT DOCUMENTS 8,989,667 B2  3/2015  Mukherjee
9,730,045 B2  8/2017  Shimazaki
(Continued)

FOREIGN PATENT DOCUMENTS

JP  2006-173946 A  6/2006
JP  2014175830 A  *  9/2014
(Continued)

OTHER PUBLICATIONS

Machine translation of JP2014175830 (Year: 2014).*
(Continued)

*Primary Examiner* — Harun Chowdhury
(74) *Attorney, Agent, or Firm* — VENABLE LLP

(57) ABSTRACT

A communication apparatus sets, in a case where an operation state of the communication apparatus is a first operation state in which data of a predetermined type is not transmitted and received, a ratio of a first period assigned for a first communication mode to a second period assigned for a second communication mode to a first ratio. In a second operation state in which data of the predetermined type is transmitted and/or received, a ratio of the first period to the second period is set to a second ratio. In a case where, in the second operation state, a channel used in one communication mode of the first communication mode and the second communication mode is a Dynamic Frequency Selection (DFS) channel, a period assigned for the one communication mode to satisfy a DFS operation regardless of the second ratio is set.

12 Claims, 27 Drawing Sheets

(51) Int. Cl.
  *H04L 67/104* (2022.01)
  *H04W 4/80* (2018.01)
  *H04W 84/12* (2009.01)
  *H04W 84/20* (2009.01)

(52) U.S. Cl.
  CPC .............. *H04W 4/80* (2018.02); *H04W 84/12* (2013.01); *H04W 84/20* (2013.01)

(58) Field of Classification Search
  CPC ............ H04L 5/0087; H04W 72/0446; H04W 72/1215; H04W 72/1263
  USPC .................................. 370/252, 328, 329, 338
  See application file for complete search history.

(56) References Cited

U.S. PATENT DOCUMENTS

| | | | |
|---|---|---|---|
| 9,867,029 B2 | 1/2018 | Shimazaki | |
| 9,883,506 B2 | 1/2018 | Mukherjee | |
| 10,379,787 B2 | 8/2019 | Yanagawa | |
| 10,667,117 B2 | 5/2020 | Shimazaki | |
| 2005/0022113 A1* | 1/2005 | Hanlon | G06F 16/41 |
| | | | 715/201 |
| 2010/0329235 A1* | 12/2010 | Trotter | H04W 72/1215 |
| | | | 370/349 |
| 2013/0215446 A1* | 8/2013 | Imai | H04N 1/00875 |
| | | | 358/1.13 |
| 2014/0320909 A1 | 10/2014 | Shimazaki | |
| 2015/0334706 A1 | 11/2015 | Mukherjee | |
| 2018/0048350 A1* | 2/2018 | Hammerschmidt | H04B 1/713 |
| 2018/0084399 A1 | 3/2018 | Shimazaki | |
| 2018/0248811 A1* | 8/2018 | Di Nallo | H04L 5/0087 |
| 2020/0015254 A1* | 1/2020 | Nakajima | H04W 72/1263 |
| 2020/0252784 A1 | 8/2020 | Shimazaki | |

FOREIGN PATENT DOCUMENTS

| | | |
|---|---|---|
| JP | 2014-216956 A | 11/2014 |
| JP | 2015-518676 A | 7/2015 |
| JP | 2017-208777 A | 11/2017 |
| JP | 2018-006813 A | 1/2018 |
| JP | 2018-007071 A | 1/2018 |
| JP | 2018-033183 A | 3/2018 |
| JP | 2019-016888 A | 1/2019 |
| WO | 2013/148698 A2 | 10/2013 |

OTHER PUBLICATIONS

Japanese Office Action dated Jun. 16, 2023, in related Japanese Patent Application No. 2018-248375.
PCT International Search Report dated Feb. 18, 2021, in PCT/JP2019/046605.

* cited by examiner

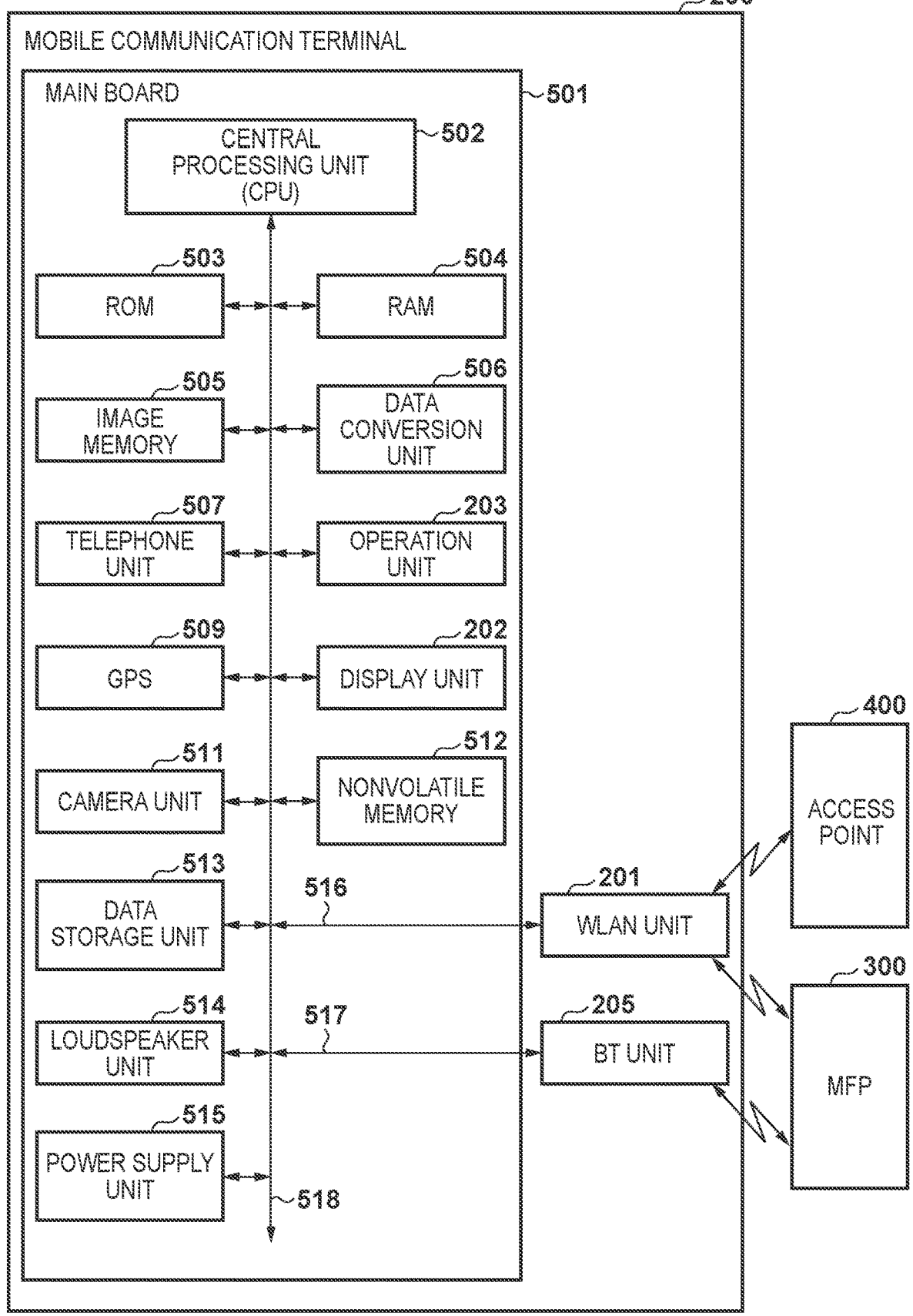

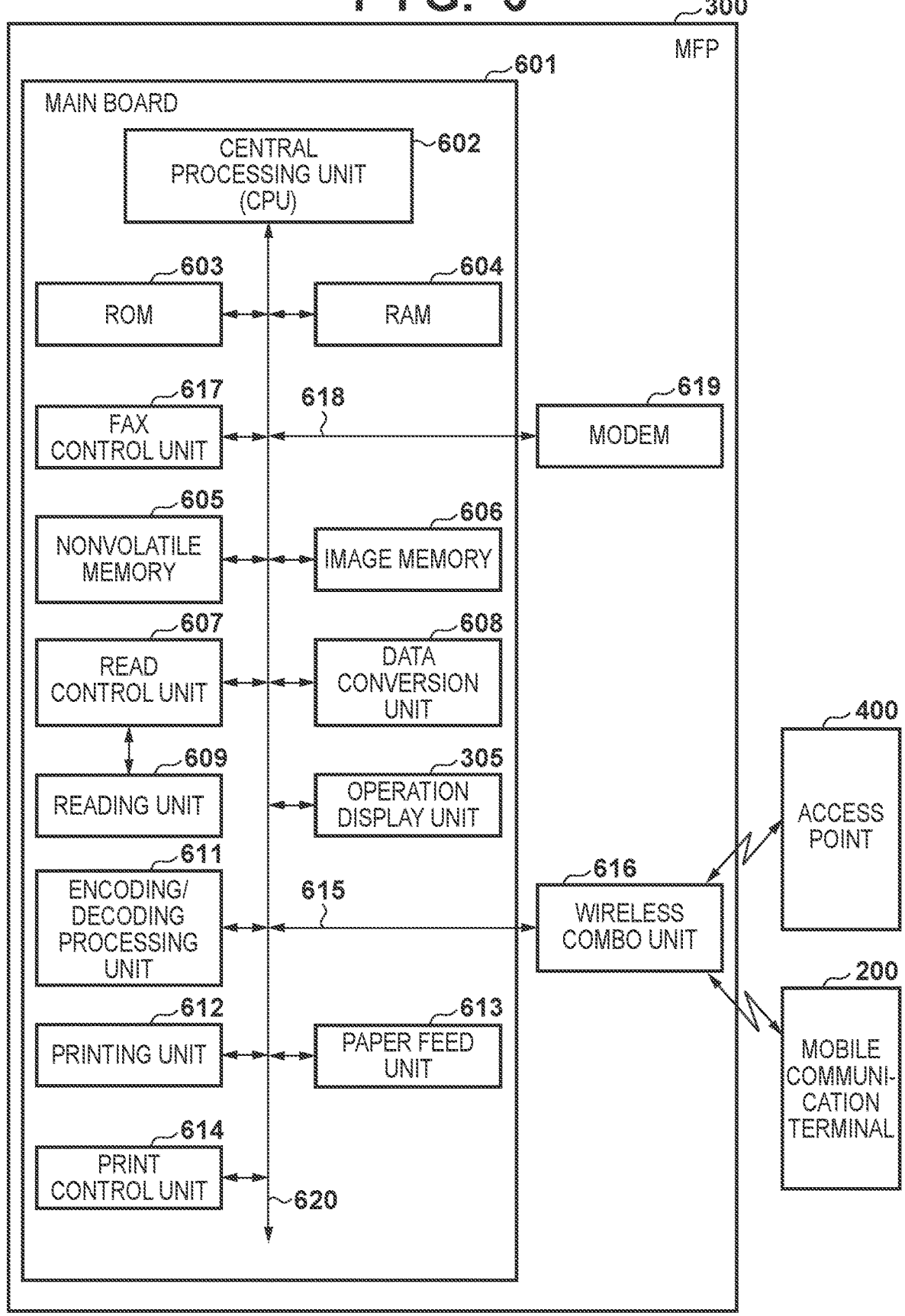

FIG. 15A

Standby TABLE

| OPERATION STATE: Standby | BLE | WIRELESS INFRASTRUCTURE MODE 2.4-GHz BAND CONNECTION | P2P MODE 2.4-GHz BAND CONNECTION |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 50% OF REMAINING TIME OTHER THAN BLE COMMUNICATION TIME DURING 100 msec | 50% OF REMAINING TIME OTHER THAN BLE COMMUNICATION TIME DURING 100 msec |

FIG. 15B

WIRELESS INFRASTRUCTURE CONNECTION PRIORITY TABLE

| OPERATION STATE: Print/Scan (WLAN INFRA) | BLE | WIRELESS INFRASTRUCTURE MODE 2.4-GHz BAND CONNECTION | P2P MODE 2.4-GHz BAND CONNECTION |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 90% OF REMAINING TIME OTHER THAN BLE COMMUNICATION TIME DURING 100 msec | 10% OF REMAINING TIME OTHER THAN BLE COMMUNICATION TIME DURING 100 msec |

FIG. 15C

P2P CONNECTION PRIORITY TABLE

| OPERATION STATE: Print/Scan (WLAN P2P) | BLE | WIRELESS INFRASTRUCTURE MODE 2.4-GHz BAND CONNECTION | P2P MODE 2.4-GHz BAND CONNECTION |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 10% OF REMAINING TIME OTHER THAN BLE COMMUNICATION TIME DURING 100 msec | 90% OF REMAINING TIME OTHER THAN BLE COMMUNICATION TIME DURING 100 msec |

Standby TABLE

FIG. 16A

| OPERATION STATE: Standby | BLE | WIRELESS INFRASTRUCTURE MODE 5-GHz BAND CONNECTION NON-DFS Ch | P2P MODE 2.4-GHz BAND CONNECTION |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 50% OF REMAINING TIME OTHER THAN BLE COMMUNICATION TIME DURING 100 msec | 50% OF REMAINING TIME OTHER THAN BLE COMMUNICATION TIME DURING 100 msec |

WIRELESS INFRASTRUCTURE CONNECTION PRIORITY TABLE

FIG. 16B

| OPERATION STATE: Print/Scan (WLAN INFRA) | BLE | WIRELESS INFRASTRUCTURE MODE 5-GHz BAND CONNECTION NON-DFS Ch | P2P MODE 2.4-GHz BAND CONNECTION |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 90% OF REMAINING TIME OTHER THAN BLE COMMUNICATION TIME DURING 100 msec | 10% OF REMAINING TIME OTHER THAN BLE COMMUNICATION TIME DURING 100 msec |

P2P CONNECTION PRIORITY TABLE

FIG. 16C

| OPERATION STATE: Print/Scan (WLAN P2P) | BLE | WIRELESS INFRASTRUCTURE MODE 5-GHz BAND CONNECTION NON-DFS Ch | P2P MODE 2.4-GHz BAND CONNECTION |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 10% OF REMAINING TIME OTHER THAN BLE COMMUNICATION TIME DURING 100 msec | 90% OF REMAINING TIME OTHER THAN BLE COMMUNICATION TIME DURING 100 msec |

FIG. 17A

Standby TABLE

| OPERATION STATE: Standby | BLE | WIRELESS INFRASTRUCTURE MODE 5-GHz BAND CONNECTION DFS Ch | P2P MODE 2.4-GHz BAND CONNECTION |
|---|---|---|---|
| PRIORITY LEVEL | 1 | 2 | 3 |
| TIME-DIVISION OCCUPANCY | ONCE PER 100 msec UNTIL COMMUNICATION IS COMPLETED | TIME WHEN DFS OPERATION CAN BE SATISFIED OTHER THAN BLE COMMUNICATION TIME DURING 100 msec | REMAINING TIME EXCLUDING LEFT DESCRIBED DURING 100 msec |

FIG. 17B

WIRELESS INFRASTRUCTURE CONNECTION PRIORITY TABLE

| OPERATION STATE: Print/Scan (WLAN INFRA) | BLE | WIRELESS INFRASTRUCTURE MODE 5-GHz BAND CONNECTION DFS Ch | P2P MODE 2.4-GHz BAND CONNECTION |
|---|---|---|---|
| PRIORITY LEVEL | 1 | 2 | 3 |
| TIME-DIVISION OCCUPANCY | ONCE PER 100 msec UNTIL COMMUNICATION IS COMPLETED | MORE THAN TIME WHEN DFS OPERATION CAN BE SATISFIED OTHER THAN BLE COMMUNICATION TIME DURING 100 msec AND LESS THAN 90 % | REMAINING TIME EXCLUDING LEFT DESCRIBED DURING 100 msec |

FIG. 17C

P2P CONNECTION PRIORITY TABLE

| OPERATION STATE: Print/Scan (WLAN P2P) | BLE | WIRELESS INFRASTRUCTURE MODE 5-GHz BAND CONNECTION DFS Ch | P2P MODE 2.4-GHz BAND CONNECTION |
|---|---|---|---|
| PRIORITY LEVEL | 1 | 2 | 3 |
| TIME-DIVISION OCCUPANCY | ONCE PER 100 msec UNTIL COMMUNICATION IS COMPLETED | TIME WHEN DFS OPERATION CAN BE SATISFIED OTHER THAN BLE COMMUNICATION TIME DURING 100 msec | REMAINING TIME EXCLUDING LEFT DESCRIBED DURING 100 msec |

FIG. 18A

Standby TABLE

| OPERATION STATE: Standby | BLE | WIRELESS INFRASTRUCTURE MODE 2.4-GHz BAND CONNECTION | P2P MODE 5-GHz BAND CONNECTION NON-DFS CH |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 50% OF REMAINING TIME OTHER THAN BLE COMMUNICATION TIME DURING 100 msec | 50% OF REMAINING TIME OTHER THAN BLE COMMUNICATION TIME DURING 100 msec |

FIG. 18B

WIRELESS INFRASTRUCTURE CONNECTION PRIORITY TABLE

| OPERATION STATE: Print/Scan (WLAN INFRA) | BLE | WIRELESS INFRASTRUCTURE MODE 2.4-GHz BAND CONNECTION | P2P MODE 5-GHz BAND CONNECTION NON-DFS CH |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 90% OF REMAINING TIME OTHER THAN BLE COMMUNICATION TIME DURING 100 msec | 10% OF REMAINING TIME OTHER THAN BLE COMMUNICATION TIME DURING 100 msec |

FIG. 18C

P2P CONNECTION PRIORITY TABLE

| OPERATION STATE: Print/Scan (WLAN P2P) | BLE | WIRELESS INFRASTRUCTURE MODE 2.4-GHz BAND CONNECTION | P2P MODE 5-GHz BAND CONNECTION NON-DFS CH |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 10% OF REMAINING TIME OTHER THAN BLE COMMUNICATION TIME DURING 100 msec | 90% OF REMAINING TIME OTHER THAN BLE COMMUNICATION TIME DURING 100 msec |

Standby TABLE

F I G. 19A

| OPERATION STATE: Standby | BLE | WIRELESS INFRASTRUCTURE MODE 2.4-GHz BAND CONNECTION | P2P MODE 5-GHz BAND CONNECTION DFS Ch |
|---|---|---|---|
| PRIORITY LEVEL | 1 | 3 | 2 |
| TIME-DIVISION OCCUPANCY | ONCE PER 100 msec UNTIL COMMUNICATION IS COMPLETED | REMAINING TIME EXCLUDING LEFT AND RIGHT DESCRIBED DURING 100 msec | TIME WHEN DFS OPERATION CAN BE SATISFIED OTHER THAN BLE COMMUNICATION TIME DURING 100 msec |

WIRELESS INFRASTRUCTURE CONNECTION PRIORITY TABLE

F I G. 19B

| OPERATION STATE: Print/Scan (WLAN INFRA) | BLE | WIRELESS INFRASTRUCTURE MODE 2.4-GHz BAND CONNECTION | P2P MODE 5-GHz BAND CONNECTION DFS Ch |
|---|---|---|---|
| PRIORITY LEVEL | 1 | 3 | 2 |
| TIME-DIVISION OCCUPANCY | ONCE PER 100 msec UNTIL COMMUNICATION IS COMPLETED | REMAINING TIME EXCLUDING LEFT AND RIGHT DESCRIBED DURING 100 msec | TIME WHEN DFS OPERATION CAN BE SATISFIED OTHER THAN BLE COMMUNICATION TIME DURING 100 msec |

P2P CONNECTION PRIORITY TABLE

F I G. 19C

| OPERATION STATE: Print/Scan (WLAN P2P) | BLE | WIRELESS INFRASTRUCTURE MODE 2.4-GHz BAND CONNECTION | P2P MODE 5-GHz BAND CONNECTION DFS Ch |
|---|---|---|---|
| PRIORITY LEVEL | 1 | 3 | 2 |
| TIME-DIVISION OCCUPANCY | ONCE PER 100 msec UNTIL COMMUNICATION IS COMPLETED | REMAINING TIME EXCLUDING LEFT AND RIGHT DESCRIBED DURING 100 msec | MORE THAN TIME WHEN DFS OPERATION CAN BE SATISFIED OTHER THAN BLE COMMUNICATION TIME DURING 100 msec AND LESS THAN 90 % |

Standby TABLE

FIG. 20A

| OPERATION STATE:<br>Standby | BLE | WIRELESS<br>INFRASTRUCTURE MODE<br>5-GHz BAND CONNECTION<br>NON-DFS Ch | P2P MODE<br>5-GHz BAND<br>CONNECTION<br>NON-DFS CH |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 50% OF REMAINING TIME OTHER THAN BLE COMMUNICATION TIME DURING 100 msec | 50% OF REMAINING TIME OTHER THAN BLE COMMUNICATION TIME DURING 100 msec |

WIRELESS INFRASTRUCTURE CONNECTION PRIORITY TABLE

FIG. 20B

| OPERATION STATE:<br>Print/Scan<br>(WLAN INFRA) | BLE | WIRELESS<br>INFRASTRUCTURE MODE<br>5-GHz BAND CONNECTION<br>NON-DFS Ch | P2P MODE<br>5-GHz BAND<br>CONNECTION<br>NON-DFS CH |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 90% OF REMAINING TIME OTHER THAN BLE COMMUNICATION TIME DURING 100 msec | 10% OF REMAINING TIME OTHER THAN BLE COMMUNICATION TIME DURING 100 msec |

P2P CONNECTION PRIORITY TABLE

FIG. 20C

| OPERATION STATE:<br>Print/Scan<br>(WLAN P2P) | BLE | WIRELESS<br>INFRASTRUCTURE MODE<br>5-GHz BAND CONNECTION<br>NON-DFS Ch | P2P MODE<br>5-GHz BAND<br>CONNECTION<br>NON-DFS CH |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | 10% OF REMAINING TIME OTHER THAN BLE COMMUNICATION TIME DURING 100 msec | 90% OF REMAINING TIME OTHER THAN BLE COMMUNICATION TIME DURING 100 msec |

Standby TABLE

FIG. 21A

| OPERATION STATE: Standby | BLE | WIRELESS INFRASTRUCTURE MODE 5-GHz BAND CONNECTION DFS Ch | P2P MODE 5-GHz BAND CONNECTION NON-DFS CH |
|---|---|---|---|
| PRIORITY LEVEL | 1 | 2 | 3 |
| TIME-DIVISION OCCUPANCY | ONCE PER 100 msec UNTIL COMMUNICATION IS COMPLETED | TIME WHEN DFS OPERATION CAN BE SATISFIED OTHER THAN BLE COMMUNICATION TIME DURING 100 msec | REMAINING TIME EXCLUDING LEFT DESCRIBED DURING 100 msec |

WIRELESS INFRASTRUCTURE CONNECTION PRIORITY TABLE

FIG. 21B

| OPERATION STATE: Print/Scan (WLAN INFRA) | BLE | WIRELESS INFRASTRUCTURE MODE 5-GHz BAND CONNECTION DFS Ch | P2P MODE 5-GHz BAND CONNECTION NON-DFS CH |
|---|---|---|---|
| PRIORITY LEVEL | 1 | 2 | 3 |
| TIME-DIVISION OCCUPANCY | ONCE PER 100 msec UNTIL COMMUNICATION IS COMPLETED | MORE THAN TIME WHEN DFS OPERATION CAN BE SATISFIED OTHER THAN BLE COMMUNICATION TIME DURING 100 msec AND LESS THAN 90 % | REMAINING TIME EXCLUDING LEFT DESCRIBED DURING 100 msec |

P2P CONNECTION PRIORITY TABLE

FIG. 21C

| OPERATION STATE: Print/Scan (WLAN P2P) | BLE | WIRELESS INFRASTRUCTURE MODE 5-GHz BAND CONNECTION DFS Ch | P2P MODE 5-GHz BAND CONNECTION NON-DFS CH |
|---|---|---|---|
| PRIORITY LEVEL | 1 | 2 | 3 |
| TIME-DIVISION OCCUPANCY | ONCE PER 100 msec UNTIL COMMUNICATION IS COMPLETED | TIME WHEN DFS OPERATION CAN BE SATISFIED OTHER THAN BLE COMMUNICATION TIME DURING 100 msec | REMAINING TIME EXCLUDING LEFT DESCRIBED DURING 100 msec |

FIG. 22A

Standby TABLE

| OPERATION STATE: Standby | BLE | WIRELESS INFRASTRUCTURE MODE 5-GHz BAND CONNECTION NON-DFS Ch | P2P MODE 5-GHz BAND CONNECTION DFS Ch |
|---|---|---|---|
| PRIORITY LEVEL | 1 | 3 | 2 |
| TIME-DIVISION OCCUPANCY | ONCE PER 100 msec UNTIL COMMUNICATION IS COMPLETED | REMAINING TIME EXCLUDING LEFT AND RIGHT DESCRIBED DURING 100 msec | TIME WHEN DFS OPERATION CAN BE SATISFIED OTHER THAN BLE COMMUNICATION TIME DURING 100 msec |

FIG. 22B

WIRELESS INFRASTRUCTURE CONNECTION PRIORITY TABLE

| OPERATION STATE: Print/Scan (WLAN INFRA) | BLE | WIRELESS INFRASTRUCTURE MODE 5-GHz BAND CONNECTION NON-DFS Ch | P2P MODE 5-GHz BAND CONNECTION DFS Ch |
|---|---|---|---|
| PRIORITY LEVEL | 1 | 3 | 2 |
| TIME-DIVISION OCCUPANCY | ONCE PER 100 msec UNTIL COMMUNICATION IS COMPLETED | REMAINING TIME EXCLUDING LEFT AND RIGHT DESCRIBED DURING 100 msec | TIME WHEN DFS OPERATION CAN BE SATISFIED OTHER THAN BLE COMMUNICATION TIME DURING 100 msec |

FIG. 22C

P2P CONNECTION PRIORITY TABLE

| OPERATION STATE: Print/Scan (WLAN P2P) | BLE | WIRELESS INFRASTRUCTURE MODE 5-GHz BAND CONNECTION NON-DFS Ch | P2P MODE 5-GHz BAND CONNECTION DFS Ch |
|---|---|---|---|
| PRIORITY LEVEL | 1 | 3 | 2 |
| TIME-DIVISION OCCUPANCY | ONCE PER 100 msec UNTIL COMMUNICATION IS COMPLETED | REMAINING TIME EXCLUDING LEFT AND RIGHT DESCRIBED DURING 100 msec | MORE THAN TIME WHEN DFS OPERATION CAN BE SATISFIED OTHER THAN BLE COMMUNICATION TIME DURING 100 msec AND LESS THAN 90 % |

Standby TABLE

FIG. 23A

| OPERATION STATE: Standby | BLE | WIRELESS INFRASTRUCTURE MODE 5-GHz BAND CONNECTION DFS Ch | P2P MODE 5-GHz BAND CONNECTION DFS Ch |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | TIME WHEN DFS OPERATION CAN BE SATISFIED OTHER THAN BLE COMMUNICATION TIME DURING 100 msec | TIME WHEN DFS OPERATION CAN BE SATISFIED OTHER THAN BLE COMMUNICATION TIME DURING 100 msec |

WIRELESS INFRASTRUCTURE CONNECTION PRIORITY TABLE

FIG. 23B

| OPERATION STATE: Print/Scan (WLAN INFRA) | BLE | WIRELESS INFRASTRUCTURE MODE 5-GHz BAND CONNECTION DFS Ch | P2P MODE 5-GHz BAND CONNECTION DFS Ch |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | TIME WHEN DFS OPERATION CAN BE SATISFIED DURING 100 msec EXCLUDING LEFT AND RIGHT DESCRIBED | MINIMUM TIME WHEN DFS OPERATION CAN BE SATISFIED OTHER THAN BLE COMMUNICATION TIME DURING 100 msec |

P2P CONNECTION PRIORITY TABLE

FIG. 23C

| OPERATION STATE: Print/Scan (WLAN P2P) | BLE | WIRELESS INFRASTRUCTURE MODE 5-GHz BAND CONNECTION DFS Ch | P2P MODE 5-GHz BAND CONNECTION DFS Ch |
|---|---|---|---|
| PRIORITY LEVEL | 1 | 2 | 2 |
| TIME-DIVISION OCCUPANCY | ONCE PER 100 msec UNTIL COMMUNICATION IS COMPLETED | MINIMUM TIME WHEN DFS OPERATION CAN BE SATISFIED OTHER THAN BLE COMMUNICATION TIME DURING 100 msec | MORE THAN TIME WHEN DFS OPERATION CAN BE SATISFIED DURING 100 msec EXCLUDING LEFT DESCRIBED |

Standby TABLE SETTING

Standby TABLE SETTING
AT TIME OF COMMUNICATION OTHER THAN BEACON PACKET TRANSMISSION OF BLE

WIRELESS INFRASTRUCTURE CONNECTION PRIORITY TABLE SETTING

P2P CONNECTION PRIORITY TABLE SETTING

Standby TABLE SETTING

Standby TABLE SETTING
AT TIME OF COMMUNICATION OTHER THAN BEACON PACKET TRANSMISSION OF BLE

WIRELESS INFRASTRUCTURE CONNECTION PRIORITY TABLE SETTING

P2P CONNECTION PRIORITY TABLE SETTING

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2019/046605, filed Nov. 28, 2019, which claims the benefit of Japanese Patent Application No. 2018-248375 filed Dec. 28, 2018, both of which are hereby incorporated by reference herein in their entirety.

BACKGROUND OF THE INVENTION

Field of the Invention

The present invention relates to a communication apparatus, a control method, and a computer-readable storage medium and, more particularly, to a technique of allocating a communication period for communication in each of a plurality of communication modes.

Background Art

There is provided a communication apparatus that can operate in a plurality of communication modes/communication methods, for example, that executes wireless communication operations in an infrastructure mode and a direct mode concurrently (see PTL 1).

CITATION LIST

Patent Literature

PTL 1: Japanese Patent Laid-Open No. 2014-216956

PTL 1 does not describe in detail control when executing wireless communication operations in a plurality of communication modes (communication methods) concurrently.

SUMMARY OF THE INVENTION

The present invention provides a technique of improving convenience in a communication apparatus that can execute wireless communication operations in a plurality of communication modes concurrently.

According to one aspect of the present invention, there is provided a communication apparatus comprising a communication unit configured to perform communication by switching a plurality of modes in a time-division manner, and a setting unit configured to set a period to be allocated for communication in each of the plurality of modes in a predetermined period based on an operation state of the communication apparatus.

Further features of the present invention will become apparent from the following description of exemplary embodiments with reference to the attached drawings.

BRIEF DESCRIPTION OF THE DRAWINGS

FIG. 5 is a block diagram showing an example of the arrangement of the mobile communication terminal apparatus;

FIG. 6 is a block diagram showing an example of the arrangement of the MFP;

FIG. 15A is a table showing an example of a wireless control setting table;

FIG. 15B is a table showing another example of the wireless control setting table;

FIG. 15C is a table showing still another example of the wireless control setting table;

FIG. 16A is a table showing still another example of the wireless control setting table;

FIG. 16B is a table showing still another example of the wireless control setting table;

FIG. 16C is a table showing still another example of the wireless control setting table;

FIG. 17A is a table showing still another example of the wireless control setting table;

FIG. 17B is a table showing still another example of the wireless control setting table;

FIG. 17C is a table showing still another example of the wireless control setting table;

FIG. 18A is a table showing still another example of the wireless control setting table;

FIG. 18B is a table showing still another example of the wireless control setting table;

FIG. 18C is a table showing still another example of the wireless control setting table;

FIG. 19A is a table showing still another example of the wireless control setting table;

FIG. 19B is a table showing still another example of the wireless control setting table;

FIG. 19C is a table showing still another example of the wireless control setting table;

FIG. 20A is a table showing still another example of the wireless control setting table;

FIG. 20B is a table showing still another example of the wireless control setting table;

FIG. 20C is a table showing still another example of the wireless control setting table;

FIG. 21A is a table showing still another example of the wireless control setting table;

FIG. 21B is a table showing still another example of the wireless control setting table;

FIG. 21C is a table showing still another example of the wireless control setting table;

FIG. 22A is a table showing still another example of the wireless control setting table;

FIG. 22B is a table showing still another example of the wireless control setting table;

FIG. 22C is a table showing still another example of the wireless control setting table;

FIG. 23A is a table showing still another example of the wireless control setting table;

FIG. 23B is a table showing still another example of the wireless control setting table;

FIG. 23C is a table showing still another example of the wireless control setting table;

DESCRIPTION OF THE EMBODIMENTS

Embodiments of the present invention will be described in detail below with reference to the accompanying drawings. Note that the embodiments are merely examples, and practical examples such as components, processing steps, and display screens are not intended to limit the scope of the present invention, unless otherwise specified.

(System Configuration)

Figure 1:
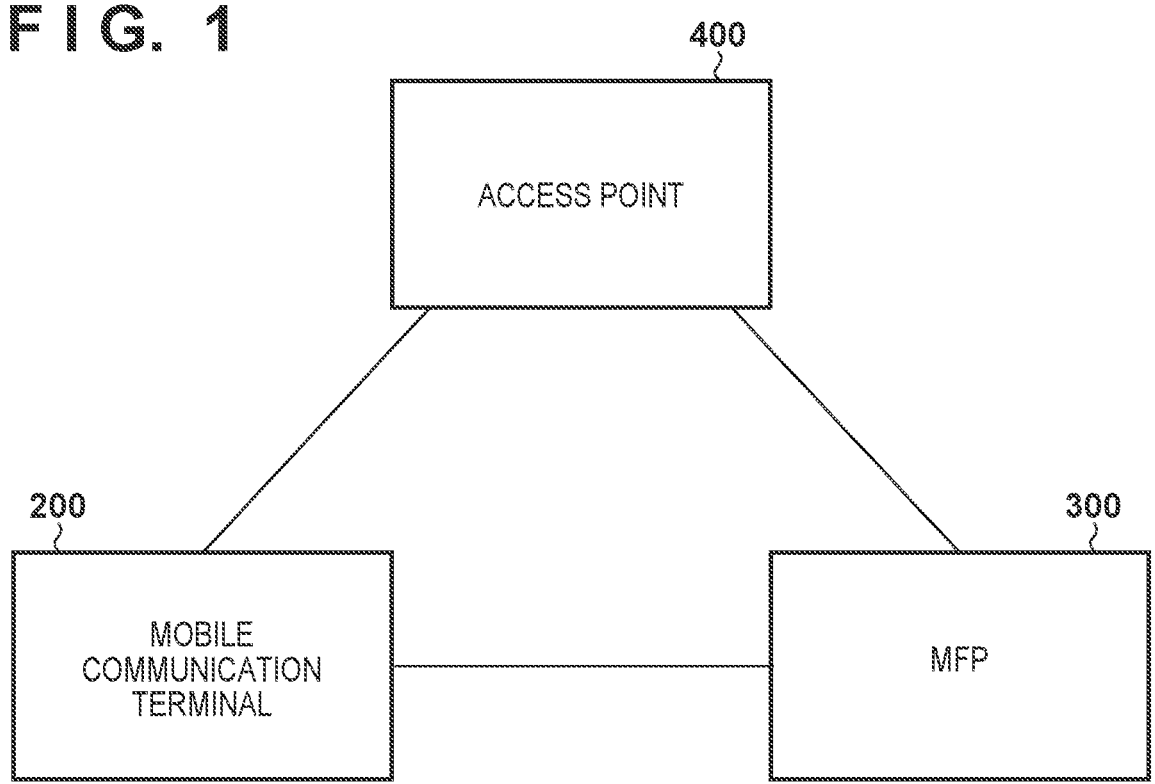
FIG. 1 is a view showing an example of a system configuration.

FIG. 1 shows an example of a system configuration according to an embodiment. In one example, this system is a wireless communication system in which a plurality of communication apparatuses can wirelessly communicate with each other. In the example shown in FIG. 1, a mobile communication terminal apparatus 200, an MFP 300, and an access point 400 are included as communication apparatuses. Note that the mobile communication terminal apparatus 200 may simply be referred to as the terminal apparatus 200 hereinafter.

The terminal apparatus 200 is a terminal apparatus (information processing apparatus) having a wireless communication function using a wireless LAN, Bluetooth®, or the like. Note that the wireless LAN may be referred to as the WLAN hereinafter and Bluetooth® may be referred to as BT hereinafter. The terminal apparatus 200 can be a personal information terminal such as a PDA (Personal Digital Assistant), a mobile phone, a digital camera, or the like. The MFP 300 is a printing apparatus having a printing function, and may have a reading function (scanner), a FAX function, and a telephone function. The MFP 300 according to this embodiment also has a communication function capable of wirelessly communicating with the terminal apparatus 200. In this embodiment, a case in which the MFP 300 is used will be described as an example but the present invention is not limited to this. For example, a facsimile apparatus, scanner apparatus, projector, mobile terminal, smartphone, notebook PC, tablet terminal, PDA, digital camera, music playback device, television, and the like each of which has a communication function may be used instead of the MFP 300. Note that MFP is an abbreviation for Multi Function Peripheral. The access point 400 is provided separately (externally) from the terminal apparatus 200 and the MFP 300, and operates as the base station apparatus of the WLAN. The communication apparatus having a WLAN communication function can perform communication in a WLAN infrastructure mode via the access point 400. Note that the access point may be referred to as the "AP" hereinafter. The infrastructure mode may be referred to as the "wireless infrastructure mode" hereinafter. The access point 400 communicates with an (authenticated) communication apparatus that is permitted to be connected to the self-apparatus, and relays communication between the communication apparatus and, for example, another communication apparatus currently connected to the self-apparatus. Furthermore, the access point 400 can be connected to, for example, a wired communication network, and can relay, via the wired communication network, communication between the communication apparatus connected to the self-apparatus and another communication apparatus connected to the wired communication network or another AP.

The terminal apparatus 200 and the MFP 300 can perform wireless communication in a peer-to-peer mode without intervention of the access point 400 or in the wireless infrastructure mode via the access point 400 using their WLAN communication functions. Note that peer-to-peer will be referred to as "P2P" hereinafter. The P2P mode includes Wi-Fi Direct® and a software AP mode. Note that Wi-Fi Direct® may be referred to as WFD hereinafter. The terminal apparatus 200 and the MFP 300 may perform P2P communication using BT communication functions. Note that in this embodiment, the terminal apparatus 200 and the MFP 300 can execute processing corresponding to a plurality of print services using WLAN communication, as will be described later.

(Outer Appearance of Terminal Apparatus)

Figure 2:
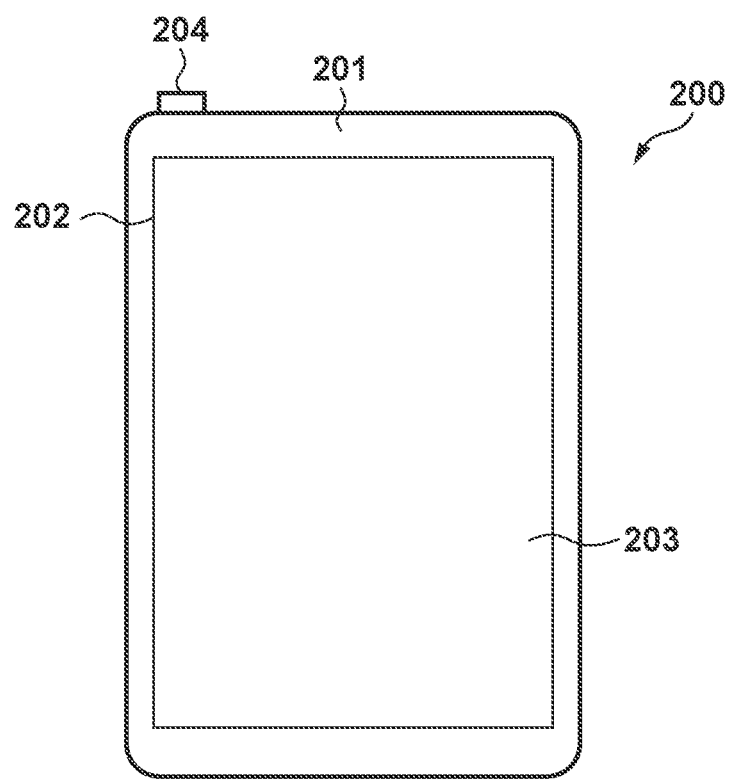
FIG. 2 is a view showing an example of the outer appearance of a mobile communication terminal apparatus.

FIG. 2 is a view showing an example of the outer appearance of the terminal apparatus 200. As one example, this embodiment will describe a case in which the terminal apparatus 200 is a smartphone of a general form. Note that the terminal apparatus 200 includes, for example, a display unit 202, an operation unit 203, and a power key 204. The display unit 202 is, for example, a display including an LCD (Liquid Crystal Display) type display mechanism. Note that the display unit 202 may display information using, for example, an LED (Light Emitting Diode). In addition to or instead of the display unit 202, the terminal apparatus 200 may have a function of outputting information by a voice. The operation unit 203 is formed by including hard keys such as keys and buttons and a touch panel for detecting a user operation. Note that in this example, since information display by the display unit 202 and acceptance of a user operation by the operation unit 203 are performed using a common touch panel display, the display unit 202 and the operation unit 203 are implemented by one device. In this case, for example, a button icon and a software keyboard are displayed using the display function of the display unit 202, and the operation acceptance function of the operation unit 203 detects a touch on the portion of the icon or keyboard by the user. Note that the display unit 202 and the operation unit 203 may be separated to individually prepare a hardware component for display and that for operation acceptance. The power key 204 is a hard key for accepting a user operation of powering on or off the terminal apparatus 200.

The terminal apparatus 200 includes a WLAN unit 201 for providing the WLAN communication function although it need not always be visible from the outer appearance. The WLAN unit 201 is configured to execute data (packet) communication in a WLAN system complying with, for example, the IEEE802.11 standard series (IEEE802.11a/b/g/n/ac and the like). However, the present invention is not limited to this, and the WLAN unit 201 may be able to execute communication in a WLAN system complying with another standard. Note that in this example, the WLAN unit 201 can perform communication in both the 2.4-GHz frequency band and 5-GHz frequency band. Assume also that the WLAN unit 201 can execute communication based on WFD, communication in the software AP mode, communication in the wireless infrastructure mode, and the like. Operations in these modes will be described later. The terminal apparatus 200 further includes a BT unit (not shown) that is not visible from the outer appearance. The BT unit complies with the IEEE802.15.1 standard, and provides a 2.4-GHz band communication function used by BT 1.1 to 5.0 such as Bluetooth BR/EDR, Bluetooth+HS, and Bluetooth Low Energy. The operation of BT will be described later.

(Outer Appearance of MFP)

Figure 3:
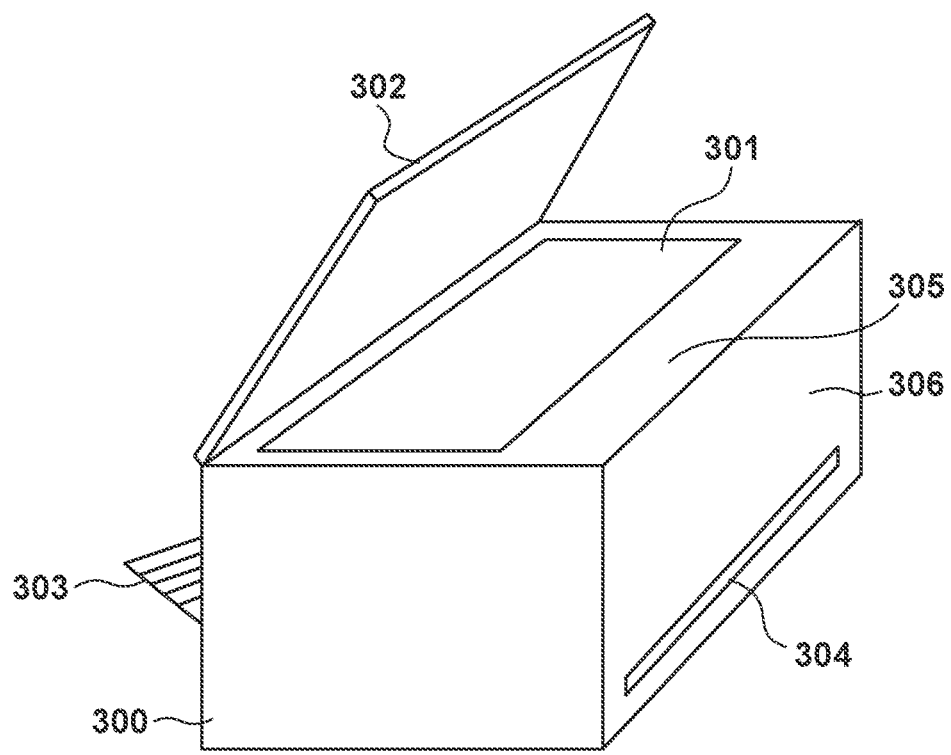
FIG. 3 is a view showing an example of the outer appearance of an MFP.

FIG. 3 shows an example of the outer appearance of the MFP 300. The MFP 300 includes, for example, a document table 301, a document cover 302, a printing paper insertion port 303, a printing paper discharge port 304, and an operation display unit 305. The document table 301 is a table on which a document to be read is placed. The document cover 302 is a cover used to press a document placed on the document table 301 and prevent external leakage of light from a light source, with which the document is irradiated at the time of reading. The printing paper insertion port 303 is an insertion port on which paper sheets of various sizes can be set. The printing paper discharge port 304 is a discharge port from which a printed paper sheet is discharged. Paper sheets set on the printing paper insertion port 303 are conveyed one by one to a printing unit, and are discharged from the printing paper discharge port 304 after they are printed by the printing unit. The operation display unit 305 includes keys such as character input keys, cursor keys, an enter key, and a cancel key and an LED or an LCD, and is configured to accept an operation of activating various functions of the MFP or an operation of making various settings by the user. The operation display unit 305 may include a touch panel display. The MFP 300 has the wireless communication function by the WLAN or BT, and includes a wireless communication antenna 306 for wireless communication although it need not always be visible from the outer appearance. Similar to the terminal apparatus 200, the MFP 300 can also perform wireless communication in both the 2.4-GHz frequency band and 5-GHz frequency band by the WLAN or BT.

Figure 4A:
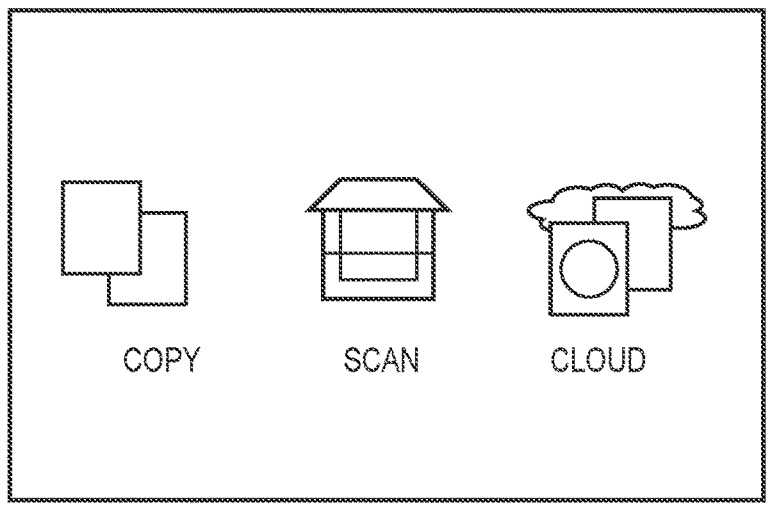
FIG. 4A is a view showing an example of an operation display unit of the MFP.
Figure 4B:
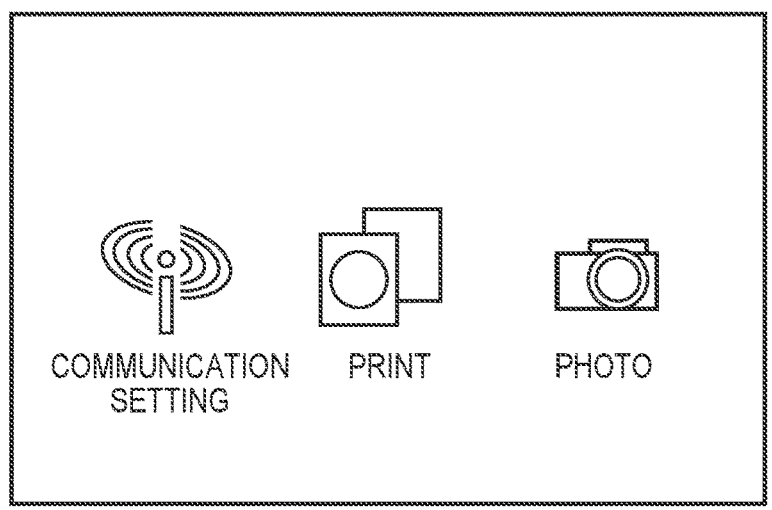
FIG. 4B is a view showing another example of the operation display unit of the MFP.
Figure 4C:
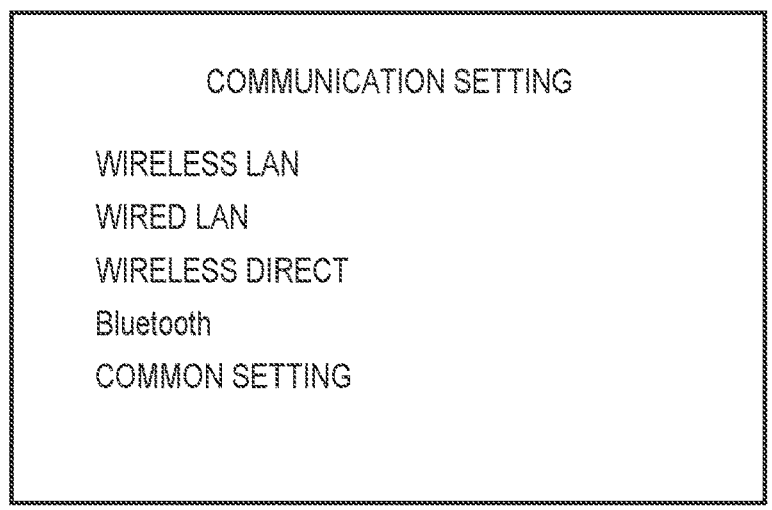
FIG. 4C is a view showing still another example of the operation display unit of the MFP.

FIGS. 4A to 4C each schematically show an example of screen display on the operation display unit 305 of the MFP 300. FIG. 4A shows an example of a home screen that is displayed in a state (idle state or Standby state) in which the MFP 300 is powered on and an operation such as a print or scan operation is not in progress. By performing a key operation or a touch panel operation, menu display of a copy function, a scan function, and a cloud function using the Internet communication operation is selected, and thus the MFP 300 can start to execute the corresponding setting or function. The MFP 300 can seamlessly display a screen different from that shown in FIG. 4A by accepting the key operation or the touch panel operation in the home screen shown in FIG. 4A. FIG. 4B shows an example of the screen, and shows an example in which a menu of execution of the print or photo function, change of the communication setting, and the like is displayed. The print or photo function or the communication setting can be executed based on user selection on this screen. FIG. 4C shows an example of a screen displayed when the communication setting is selected on the screen shown in FIG. 4B. Various LAN setting menus ("wired LAN", "wireless LAN", and "wireless direct") such as wired connection setting, active/inactive setting of the wireless infrastructure mode, and active/inactive setting of the P2P mode like the WFD or software AP mode are selectably displayed on this screen. Note that if the wireless LAN is activated by a user operation in FIG. 4C, the wireless infrastructure mode is activated. If the wireless direct is activated by a user operation, the P2P mode is activated. On this screen, a setting menu ("Bluetooth") of BT setting such as active/inactive setting of BT is also selectably displayed. Furthermore, a common setting menu concerning each connection form is displayed on this screen. A setting menu operation such as setting of the frequency band and frequency channel of the wireless LAN and setting of a code for BT pairing can be performed on this screen.

(Arrangement of Terminal Apparatus)

FIG. 5 shows an example of the arrangement of the terminal apparatus 200. In one example, the terminal apparatus 200 includes a main board 501 for executing main control of the apparatus itself, the WLAN unit 201 for performing WLAN communication, and a BT unit 205 for performing BT communication. The main board 501 includes, for example, a CPU 502, a ROM 503, a RAM 504, an image memory 505, a data conversion unit 506, a telephone unit 507, a GPS 509, a camera unit 511, a nonvolatile memory 512, a data storage unit 513, a loudspeaker unit 514, and a power supply unit 515. CPU is an abbreviation for Central Processing Unit, ROM is an abbreviation for Read Only Memory, RAM is an abbreviation for Random Access Memory, and GPS is an abbreviation for Global Positioning System. The terminal apparatus 200 includes the display unit 202 and the operation unit 203. The functional units in the main board 501 are interconnected via a system bus 518 managed by the CPU 502. The main board 501 is connected to the WLAN unit 201 and the BT unit 205 via, for example, a dedicated bus 516.

The CPU 502 is a system control unit, and controls the overall terminal apparatus 200. In one example, the processing of the terminal apparatus 200 to be described below is implemented when the CPU 502 executes a program stored in the ROM 503. Note that dedicated hardware for each process may be prepared. The ROM 503 stores control programs to be executed by the CPU 502, an embedded operating system (OS) program, and the like. In this embodiment, when the CPU 502 executes respective control programs stored in the ROM 503 under the management of the embedded OS stored in the ROM 503, software control such as scheduling and task switching is executed. The RAM 504 is implemented by an SRAM (Static RAM) or the like. The RAM 504 stores data such as program control variables, and also stores data such as setting values registered by the user and management data of the terminal apparatus 200. Furthermore, the RAM 504 can be used as various work buffers. The image memory 505 is implemented by a memory such as a DRAM (Dynamic RAM). The image memory 505 temporarily stores image data received via the WLAN unit 201 or the BT unit 205 and those read out from the data storage unit 513 so as to be processed by the CPU 502. The nonvolatile memory 512 is implemented by a memory such as a flash memory, and continuously stores data even after the terminal apparatus 200 is powered off. Note that the memory arrangement of the terminal apparatus 200 is not limited to the above-described one. For example, the image memory 505 and the RAM 504 may share a memory, or data may be backed up using the data storage unit 513. In this embodiment, an example of the image memory 505 is a DRAM. However, another storage medium such as a hard disk or a nonvolatile memory may be used.

The data conversion unit 506 executes analysis of data of various formats, and data conversion such as color conversion and image conversion. The telephone unit 507 controls a telephone line, and implements telephone communication by processing audio data input/output via the loudspeaker unit 514. The GPS 509 obtains position information such as the current latitude and longitude of the terminal apparatus 200 by receiving a radio wave sent from a satellite. The camera unit 511 has a function of electronically recording and encoding an image input via a lens. Image data obtained by image capturing of the camera unit 511 is saved in the data storage unit 513. The loudspeaker unit 514 executes control to realizes a function of inputting or outputting a speech for a telephone function, and also an alarm notification function and the like. The power supply unit 515 is, for example, a portable battery, and controls power supply to the apparatus. A power supply state includes, for example, a battery dead state in which the battery has no remaining amount, a power-off state in which the power key 204 is not pressed, an active state in which the apparatus is normally active, and a power saving state in which the apparatus is active but is set in a power saving mode. The display unit 202 is the display unit 202 described with reference to FIG. 2, and electronically controls the display contents to execute control for performing various input operations and display of the operation state and status condition of the MFP 300. The operation unit 203 is the operation unit 203 described with reference to FIG. 2, and executes, in response to acceptance of a user operation, control for generating an electrical signal corresponding to the operation and outputting it to the CPU 502.

The terminal apparatus 200 performs wireless communication using the WLAN unit 201 or the BT unit 205, and performs data communication with another device such as the MFP 300. The WLAN unit 201 or the BT unit 205 converts data into packets, and transmits the packets to the other device. The WLAN unit 201 or the BT unit 205 reconstructs packets from another external device into original data, and outputs the data to the CPU 502. Each of the WLAN unit 201 and the BT unit 205 is a unit for implementing communication complying with the WLAN or BT standard. The WLAN unit 201 can concurrently operate in at least two communication modes including the wireless infrastructure mode and the P2P mode. The BT unit 205 can operate in, for example, a communication mode complying with BT 1.1 to 5.0. Note that the frequency band used in each of these communication modes can be limited by the hardware function or performance.

(Arrangement of MFP)

FIG. 6 shows an example of the arrangement of the MFP 300. The MFP 300 includes a main board 601 for executing main control of the apparatus itself and a wireless combo unit 616 as a communication module for performing WLAN communication and BT communication using at least one common antenna. The MFP 300 also includes, for example, a modem 619 for performing wired communication. The main board 601 includes, for example, a CPU 602, a ROM 603, a RAM 604, a nonvolatile memory 605, an image memory 606, a read control unit 607, a data conversion unit 608, a reading unit 609, and an encoding/decoding processing unit 611. The main board 601 also includes, for example, a printing unit 612, a paper feed unit 613, a print control unit 614, and the operation display unit 305. The functional units in the main board 601 are interconnected via a system bus 620 managed by the CPU 602. Furthermore, the main board 601 and the wireless combo unit 616 are connected via, for example, a dedicated bus 615, and the main board 601 and the modem 619 are connected via, for example, a bus 618.

The CPU 602 is a system control unit, and controls the overall MFP 300. In one example, the processing of the MFP 300 to be described below is implemented when the CPU 602 executes a program stored in the ROM 603. Note that dedicated hardware for each process may be prepared. The ROM 603 stores control programs to be executed by the CPU 602, an embedded OS program, and the like. In this embodiment, when the CPU 602 executes the respective control programs stored in the ROM 603 under the management of the embedded OS stored in the ROM 603, software control such as scheduling and task switching is executed. The RAM 604 is implemented by an SRAM or the like. The RAM 604 stores data such as program control variables, and also stores data such as setting values registered by the user and management data of the MFP 300. Furthermore, the RAM 604 can be used as various work buffers. The nonvolatile memory 605 is implemented by a memory such as a flash memory, and continuously stores data even after the MFP 300 is powered off. The image memory 606 is implemented by a memory such as a DRAM. The image memory 606 stores image data received via the wireless combo unit 616, those processed by the encoding/decoding processing unit 611, and the like. Note that the memory arrangement of the MFP 300 is not limited to the above-described one, similar to the terminal apparatus 200. The data conversion unit 608 executes analysis of data of various formats, conversion from image data into print data, and the like.

The read control unit 607 controls the reading unit 609 (for example, a CIS (contact type image sensor)) to optically read a document placed on the document table 301. The read control unit 607 converts, into electrical image data (image signal), an image obtained by optically reading the document, and outputs the thus obtained image data. At this time, the read control unit 607 may perform various kinds of image processes such as binarization processing and halftone processing for the image data, and then output the resultant data. The operation unit 305 corresponds to the operation display unit 305 described with reference to FIGS. 4A to 4C, and executes display control, control of generation of an electrical signal corresponding to a user operation, and the like.

The encoding/decoding processing unit 611 executes encoding processing and decoding processing of image data (JPEG, PNG, or the like) handled by the MFP 300, and enlargement/reduction processing. The paper feed unit 613 holds paper sheets for printing. The paper feed unit 613 can feed a set paper sheet under the control of the print control unit 614. The paper feed unit 613 may include a plurality of paper feed units so as to hold a plurality of types of paper sheets in one apparatus, and can control to select a paper feed unit to supply paper sheets under the control of the print control unit 614. The print control unit 614 performs various kinds of image processes such as smoothing processing, printing density correction processing, and color correction for image data to be printed, and outputs, to the printing unit 612, the image data after the processing. The printing unit 612 is configured to execute, for example, inkjet print processing, and prints an image on a print medium such as a paper sheet by discharging, from a printhead, ink supplied from an ink tank. Note that the printing unit 612 may be configured to execute another print processing such as electrophotographic printing. The print control unit 614 can periodically read out information of the printing unit 612, and update status information which includes the remaining amount of an ink tank and a printhead state and is stored in the RAM 604.

The wireless combo unit 616 is a unit that can provide the WLAN and BT communication functions, and can provide, for example, a function similar to that of the combination of the BT unit and the WLAN unit 201 of the terminal apparatus 200. That is, in accordance with the WLAN or BT standard, the wireless combo unit 616 converts data into packets and transits the packets to another device, and also reconstructs packets from another external device into original data and outputs the data to the CPU 602. Note that the terminal apparatus 200 and the MFP 300 can perform P2P communication based on WFD, and the wireless combo unit 616 has a software access point (software AP) function or a group owner function. That is, the wireless combo unit 616 can create a P2P communication network, and determine a channel to be used for P2P communication.

(P2P Communication Method)

A P2P communication method in which apparatuses directly, wirelessly communicate with each other without intervention of an external access point in WLAN communication will generally be described. P2P communication can be implemented using a plurality of methods. For example, a communication apparatus can support a plurality of modes for P2P communication, and execute P2P communication by selectively using one of the plurality of modes.

In each mode, a search-side communication apparatus searches for a searched-side communication apparatus (partner apparatus) using a search signal (for example, a Probe Request frame or Beacon) for searching for the partner apparatus, and then discovers it. Note that in the search for the partner apparatus, a frequency band and communication method to be used on the search side need to match those on the searched side. For example, the user can set the MFP 300 so as to operate in a desired P2P mode from (1) a WLAN P2P mode in the 2.4-GHz frequency band, (2) a BT P2P mode in the 2.4-GHz frequency band, and (3) a WLAN P2P mode in the 5-GHz frequency band. Assume that the user sets the MFP 300 so as to operate in, for example, the WLAN P2P mode in the 2.4-GHz frequency band. In this case, even if the search-side communication apparatus such as the terminal apparatus 200 transmits a search signal in the 5-GHz band, the MFP 300 is not in a state in which it can receive the search signal in the 5-GHz band, and thus does not transmit a response signal to the search signal. Assume that the user sets the MFP 300 so as to operate in the BT P2P mode in the 2.4-GHz band. In this case, for example, even if the search-side communication apparatus such as the terminal apparatus 200 transmits a search signal in the same 2.4-GHz band, if the search signal is a WLAN search signal, the MFP 300 does not recognize the search signal, and thus does not transmit a response signal. As described above, the search-side communication apparatus can discover the searched-side partner apparatus whose frequency band and communication method used match those of the search-side communication apparatus.

As the P2P modes, the following four modes are assumed.
mode A (software AP mode)
mode B (Wi-Fi Direct (WFD) mode)
mode D (Bluetooth Low Energy (BLE) mode)
mode E (Bluetooth Classic (BT) mode)

A communication apparatus capable of executing P2P communication can be configured to support at least one of these modes. On the other hand, even a communication apparatus capable of executing P2P communication need not support all the modes, and may be configured to support some of the modes. Note that the communication apparatus can cope with the wireless infrastructure mode (mode C) in addition to the P2P modes.

The communication apparatus (for example, the terminal apparatus 200) having the communication function by WFD or BT calls an application (a dedicated application in some cases) for implementing the communication function by accepting a user operation via the operation unit. Then, the communication apparatus can display a screen of a UI (User Interface) provided by the application to prompt the user to perform a user operation, and execute WFD or BT communication based on the accepted user operation. Note that BT communication indicates communication complying with BT 1.1 to 5.0 such as Bluetooth Classic and Bluetooth Low Energy.

Subsequently, partner apparatus search sequences (apparatus search sequences) in the above-described four P2P modes will be described.

Apparatus Search Sequence in Mode A (Software AP Mode)

Figure 7:
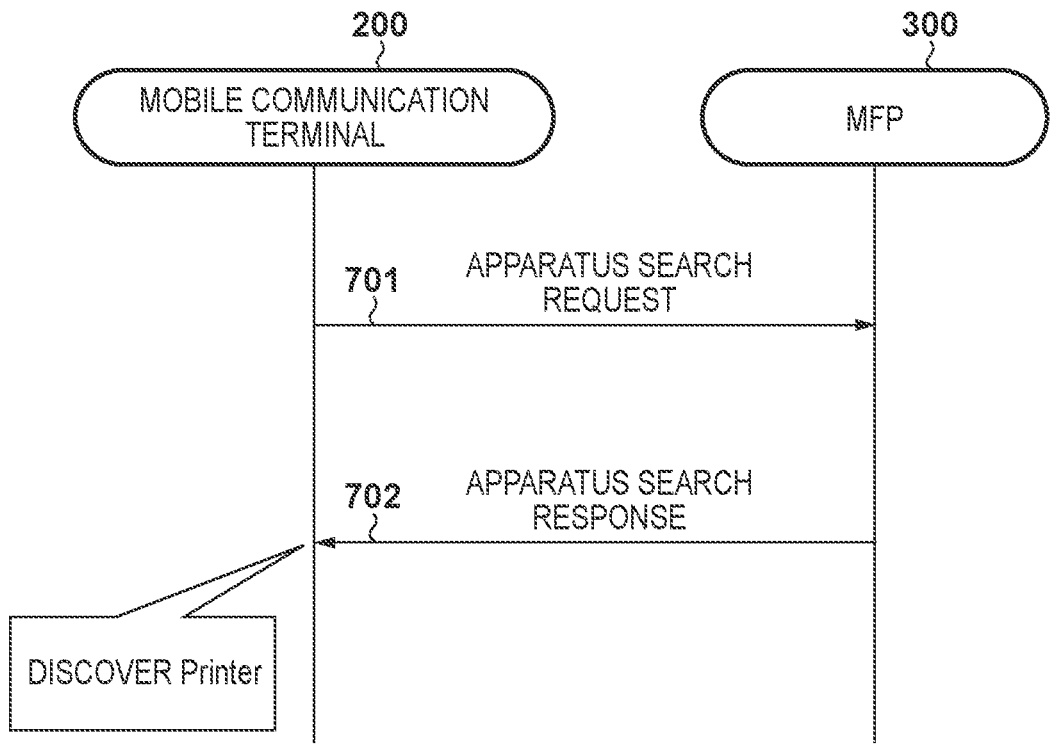
FIG. 7 is a sequence chart showing an example of an apparatus search sequence in mode A (software AP mode)

FIG. 7 shows the apparatus search sequence in mode A (software AP mode). In the software AP mode, a communication apparatus (for example, the terminal apparatus 200) plays the role of a client that requests various services. Another communication apparatus (for example, the MFP 300) operates as a software AP that can execute the function of an AP in the WLAN by software settings. In the software AP mode, the communication apparatus operating as the client searches for the communication apparatus operating as the software AP by transmitting an apparatus search request 701. Upon receiving the apparatus search request 701, the software AP transmits an apparatus search response 702 as a response to the request. By transmitting/receiving the apparatus search request and the apparatus search response, the communication apparatus (for example, the terminal apparatus 200) operating as the client discovers the partner apparatus (for example, the MFP 300) operating as the software AP. Note that as commands and parameters transmitted/received when establishing wireless connection between the client and the software AP, commands and parameters defined by the Wi-Fi® standard suffice, and a description thereof will be omitted. The MFP 300 operating in the software AP mode serves as a master station to determine the frequency band and the frequency channel. Therefore, the MFP 300 can select one of the 5- and 2.4-GHz frequency bands to be used and select the frequency channel to be used in the frequency band.

Apparatus Search Sequence in Mode B (WFD Mode)

Figure 8:
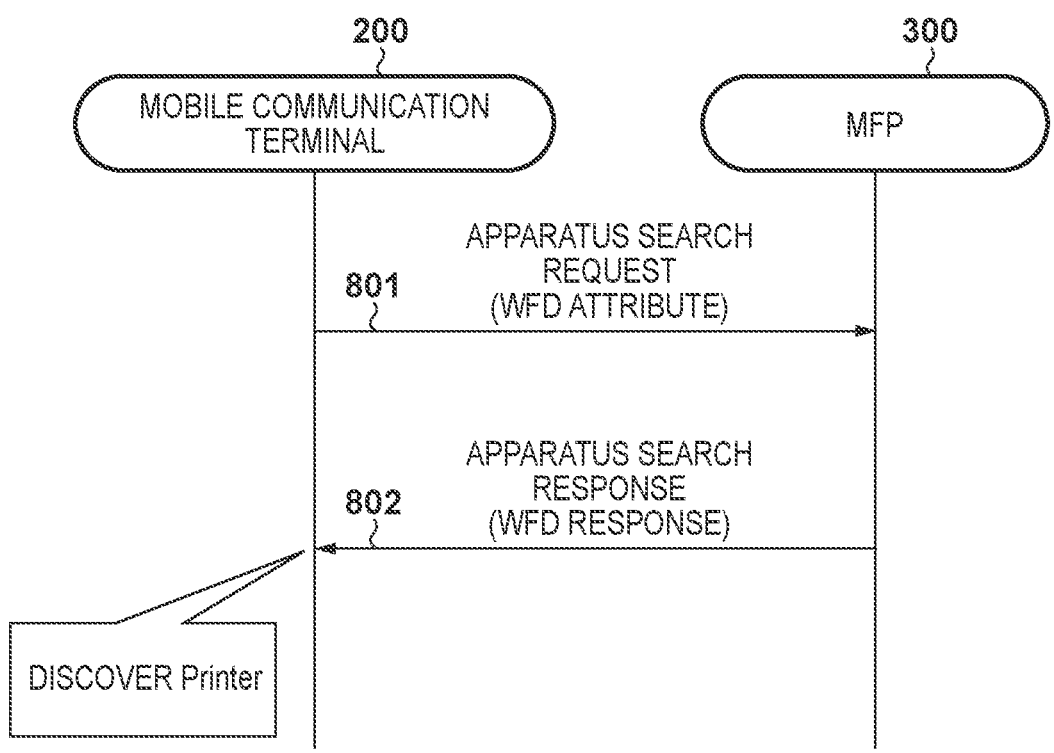
FIG. 8 is a sequence chart showing an example of an apparatus search sequence in mode B (WFD mode)

FIG. 8 shows the apparatus search sequence in mode B (WFD mode). In the WFD mode, the search-side communication apparatus searches for the searched-side partner apparatus by transmitting an apparatus search request 801. Assume that the search-side communication apparatus is the terminal apparatus 200 and the searched-side partner apparatus is the MFP 300. The apparatus search request 801 has a WFD attribute, which can specify that a search target is a communication apparatus in the WFD mode. If the MFP 300 receives the apparatus search request 801 while operating in the WFD mode, it transmits an apparatus search response 802 to the terminal apparatus 200 as a response to the request. Upon receiving the apparatus search response 802, the terminal apparatus 200 detects the MFP 300 as a P2P communication partner. After completion of the apparatus search, these communication apparatuses determine the roles of a P2P group owner (GO) and P2P client, and perform the remaining wireless connection processing. The role determination processing corresponds to, for example, GO Negotiation in P2P. On the other hand, if a wireless chip set restriction is imposed on the MFP 300 when the wireless infrastructure mode and the WFD mode operate concurrently, it is necessary to match the frequency bands and frequency channels used in the two modes operating concurrently. Therefore, the MFP 300 may be fixedly activated as the master station (Autonomous Group Owner) in the WFD mode. In this case, communication of GO Negotiation is unnecessary to determine the roles. Furthermore, in this case, the MFP 300 serves as the master station to determine the frequency band and the frequency channel. Thus, the MFP 300 can select one of the 5- and 2.4-GHz frequency bands to be used and select the frequency channel to be used in the frequency band.

Apparatus Search Sequence in Mode D (BLE Mode)

Figure 10:
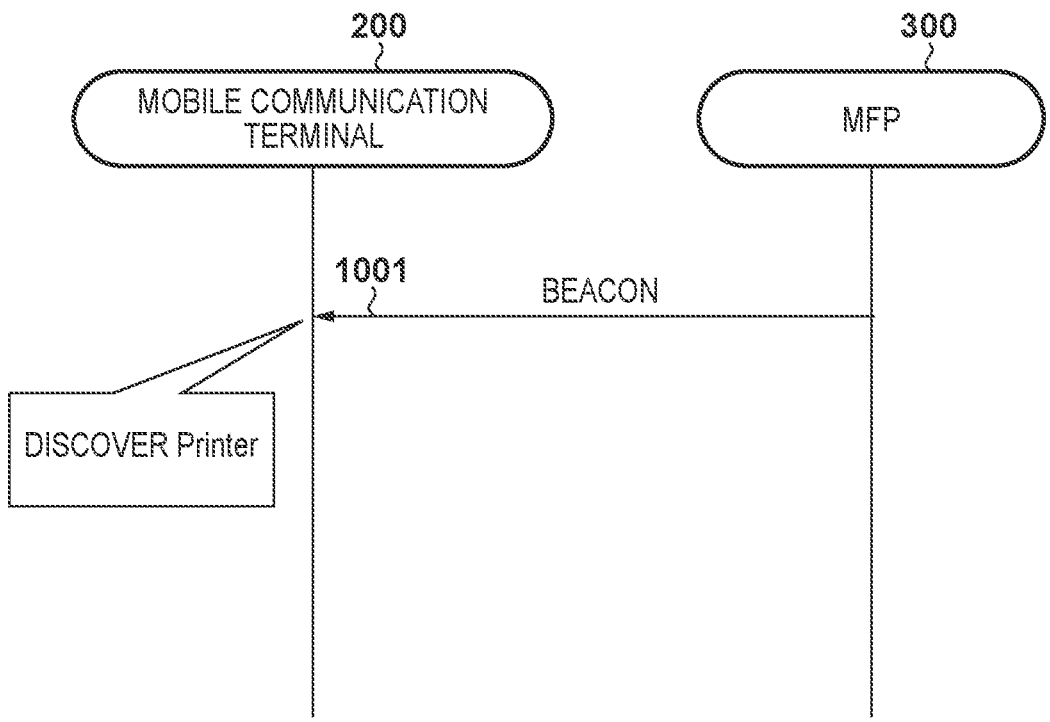
FIG. 10 is a sequence chart showing an example of an apparatus search sequence in mode D (BLE mode)

FIG. 10 shows the apparatus search sequence in mode D (BLE mode). In the BLE mode, a communication apparatus sends a beacon 1001. Another communication apparatus can recognize the existence of the communication apparatus by receiving the beacon 1001. For example, if the MFP 300 sends the beacon 1001, the terminal apparatus 200 can recognize the existence of the MFP 300 by receiving the beacon 1001. In this case, after receiving the beacon 1001, the terminal apparatus 200 executes control communication for connection to the MFP 300 by P2P. Note that as commands and parameters used for control communication for connection, commands and parameters defined by the BT 4.1 standard or the like suffice, and a description thereof will be omitted.

Apparatus Search Sequence in Mode E (BT Mode)

Figure 11:
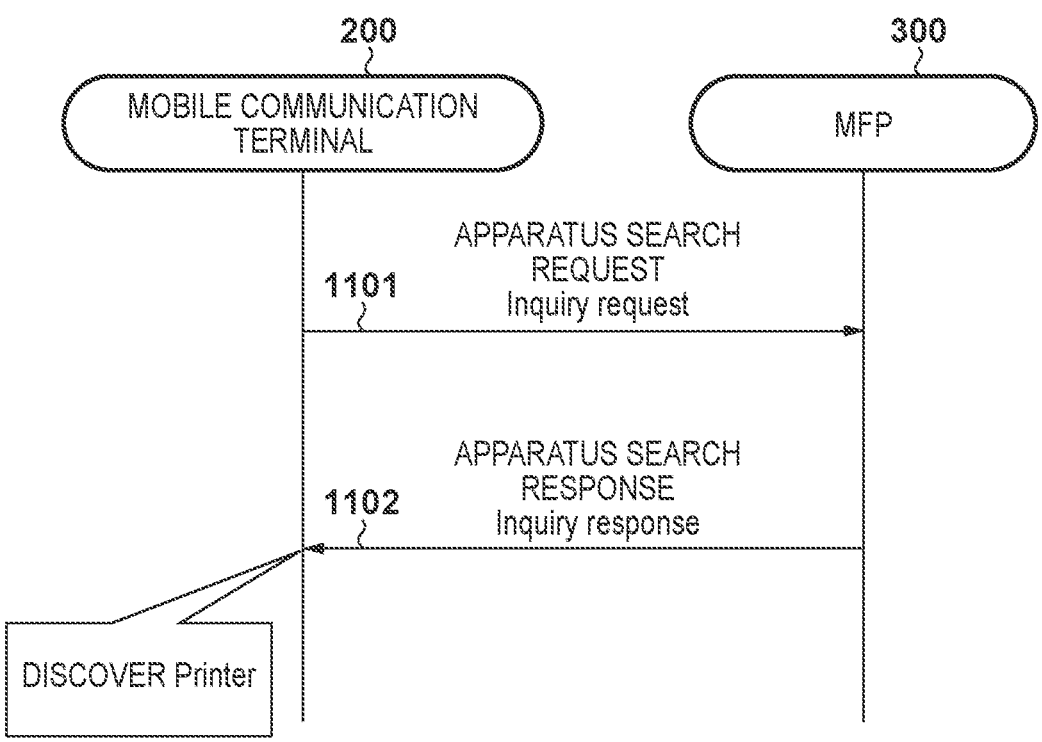
FIG. 11 is a sequence chart showing an example of an apparatus search sequence in mode E (BT mode)

FIG. 11 shows the apparatus search sequence in mode E (BT mode). In the BT mode, one communication apparatus operates as a master that searches for a BT apparatus, and another communication apparatus operates as a slave. In one example, assume that the terminal apparatus 200 operates as a master and the MFP 300 operates as a slave. The terminal apparatus 200 (master) searches for the partner apparatus by transmitting an apparatus search request 1101. Upon receiving the apparatus search request 1101, the MFP 300 (slave) transmits an apparatus search response 1102 as a response signal. A procedure of transmission/reception or connection by commands and parameters including the apparatus search request 1101 and the apparatus search response 1102 is defined by BT 1.1 and its various standards, and a description thereof will be omitted.

(Wireless Infrastructure Mode)

Figure 9:
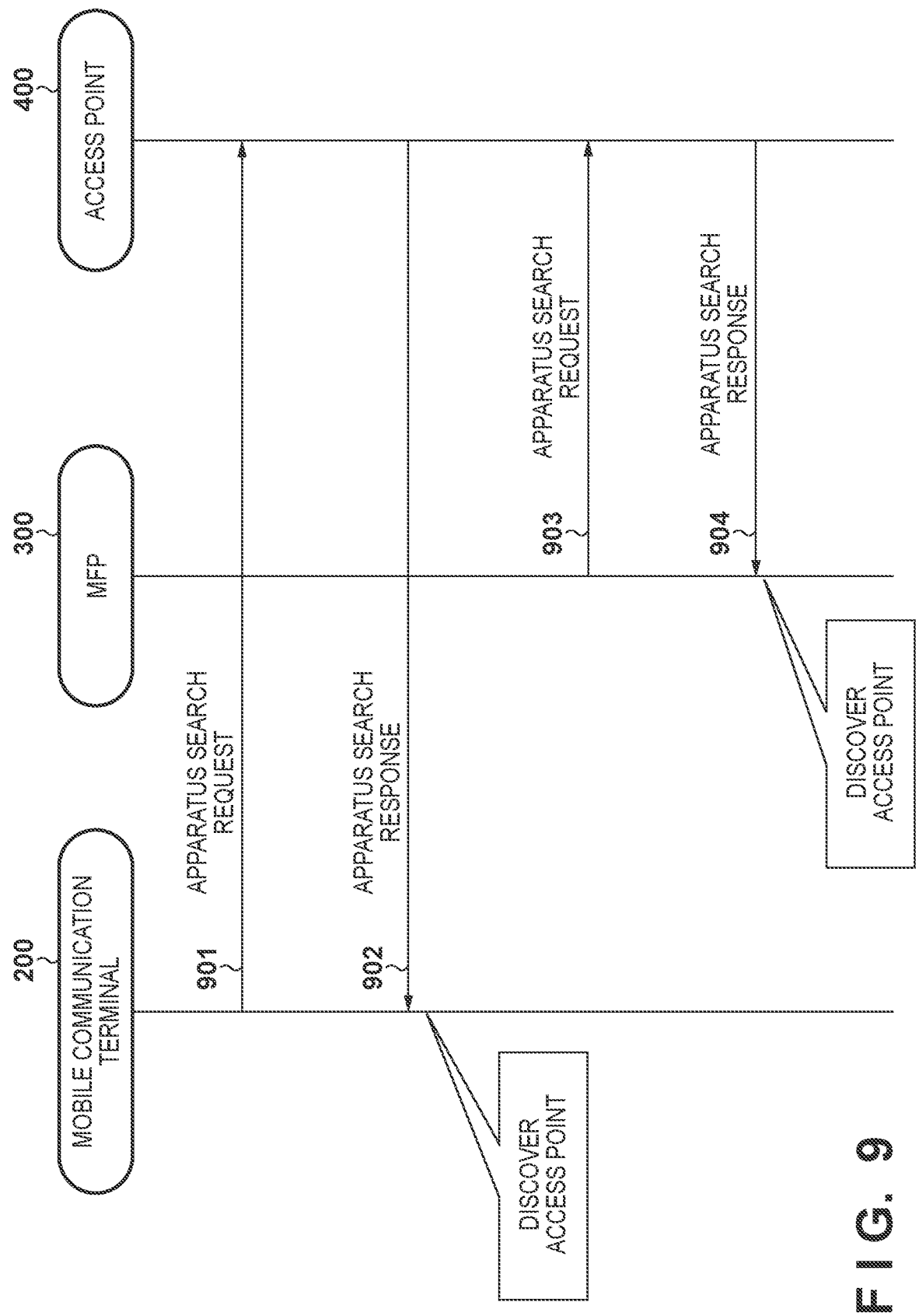
FIG. 9 is a sequence chart showing an example of an apparatus search sequence in mode C (wireless infrastructure mode)

FIG. 9 is a sequence chart showing an apparatus search sequence in mode C (wireless infrastructure mode). In the wireless infrastructure mode, communication apparatuses (for example, the terminal apparatus 200 and the MFP 300) which communicate with each other are connected to an external AP (for example, the access point 400) that controls a network and communication between the communication apparatuses is performed via the AP. In other words, communication between the communication apparatuses is executed via the network created by the external AP. In the wireless infrastructure mode, for example, the terminal apparatus 200 searches for the access point 400 by transmitting an apparatus search request 901. The access point 400 transmits an apparatus search response 902 in response to the apparatus search request 901. The terminal apparatus 200 discovers the access point 400 by receiving the apparatus search response 902. Similarly, the MFP 300 also discovers the access point 400 by transmitting an apparatus search request 903 and receiving an apparatus search response 904. When each of the terminal apparatus 200 and the MFP 300 discovers the access point 400 and is connected to it, these communication apparatuses can communicate with each other via the access point 400. Note that a plurality of communication apparatuses may be connected to different APs. In this case, when data transfer is performed between the APs (for example, via the wired network), communication between the communication apparatuses is possible. As commands and parameters transmitted/received at the time of communication between the communication apparatuses via the access point, commands and parameters defined by the Wi-Fi standard suffice, and a description thereof will be omitted. In this case, the access point 400 determines the frequency band and the frequency channel. Therefore, the access point 400 can select one of the 5- and 2.4-GHz frequency bands to be used and select the frequency channel to be used in the frequency band.

(Overview of Processing)

There is a case in which convenience deteriorates when one wireless communication apparatus operates a plurality of wireless interfaces concurrently. For example, when a plurality of wireless interfaces are made to be connectable concurrently by one CPU and one set of antennas, it may be impossible to sufficiently ensure the communication time of the wireless interface used for data communication, thereby impairing convenience. Note that one set of antennas indicates, for example, one antenna or one set of array antennas. Therefore, for example, when operating the wireless infrastructure mode, the P2P mode such as the WFD mode, and the P2P mode such as the BLE mode concurrently, the communication interval or communication speed may be unstable depending on the operation state in the MFP 300 including the wireless combo unit 616, as described above. Note that this embodiment will describe a case in which the MFP 300 includes one antenna but one or more antennas may be provided.

In this embodiment, a restriction on stability of communication when a setting of using the plurality of interfaces concurrently is made in the communication apparatus is avoided by control in the communication apparatus. More specifically, if the MFP 300 according to this embodiment is connected to a plurality of partner apparatuses (for example, the terminal apparatus 200 and the access point 400) by the plurality of wireless interfaces, it executes control to operate in a time-division manner. Then, the MFP 300 executes control to change, in accordance with the operation state of the self-apparatus, the ratio of a time length when performing time-division communication using each wireless interface. Time-division control based on the operation state will be described below. Note that the user can activate the wireless infrastructure mode and P2P mode of the WLAN and the BLE mode using, for example, the screen shown in FIG. 4C. This operation allows the MFP 300 to concurrently maintain wireless connection in the infrastructure mode for allowing wireless communication with the communication partner apparatus via the external access point, wireless connection in the peer-to-peer mode for allowing the self-apparatus to function as a master station without intervention of the external access point to perform wireless communication with the communication partner apparatus (slave station), and wireless connection by BLE.

(Time-Division Control Based on Operation State)

The wireless combo unit 616 of the MFP 300 can perform, for example, WLAN communication complying with the IEEE802.11 standard series in the 2.4- and 5-GHz bands, and also perform communication complying with the BLE standard of BT 4.1 or above. The operation state of the MFP 300 using the wireless combo unit 616 includes, for example, "Standby", "Print", "Scan", and "BLE communication in progress". Note that "Standby" indicates a state in which the MFP 300 is in a power-on state, and can accept a print instruction or scan instruction but does not actually perform print processing or scan processing. "Print" indicates a state from when reception of print data from the external apparatus (for example, the terminal apparatus 200) starts until the print processing is completed. "Scan" indicates a state from when a scan execution instruction is received from the external apparatus (for example, the terminal apparatus 200) or the operation display unit 305 until transmission processing of scan data to the external apparatus is completed. "BLE communication in progress" indicates a state from when transmission of a beacon starts until BLE communication with the communication partner apparatus (in this embodiment, the terminal apparatus 200) is completed. When the operation state is "Print" or "Scan", the MFP 300 performs data communication by wireless communication in the wireless infrastructure mode or wireless communication in the P2P mode in the WLAN using the wireless combo unit 616. Furthermore, the MFP 300 can activate the wireless infrastructure and P2P mode of the WLAN concurrently. A time length to be allocated to each mode is determined based on which of data communication in the wireless infrastructure mode and that in the P2P mode among the two modes needs more wireless resources. In the BLE mode, it is necessary to send a beacon every 100 msec. Thus, while BLE communication is active, the MFP 300 allocates, to BLE communication, a period from the start of beacon transmission every 100 msec until the end of beacon transmission and a predetermined period after the end of beacon transmission. For example, during the predetermined period, the MFP 300 can receive a request packet from the terminal apparatus 200. In the state of "BLE communication in progress", the MFP 300 allocates, to BLE communication, a period for data transmission/reception by BLE in addition to the period for beacon transmission every 100 msec. Note that 100 msec is merely an example, and another interval may be used.

<Setting at Time of Activation>

The MFP 300 is configured to activate a processing sequence (initial setup) dedicated for initial activation, that is different from a normal processing sequence, when the user who has purchased the main body powers it on for the first time, in order to make initial settings in a factory shipping state (arrival state). For example, the MFP 300 is shipped in a state in which no ink tank or printhead is attached to the printing unit 612. Therefore, it is necessary to prepare the MFP 300 to be usable by, for example, prompting the user to perform processing of attaching the ink tank and printhead packaged together immediately after initial activation operated by the user for the first time. Whether the MFP 300 is in an initial activation state representing the factory shipping state is controlled using a flag (initial activation flag) saved in the nonvolatile memory 605. Upon completion of preparation of the MFP 300 to be used by the user, the state of the initial activation flag is changed, and the MFP 300 is configured not to activate the processing sequence dedicated for initial activation after completion of the preparation.

Figure 12:
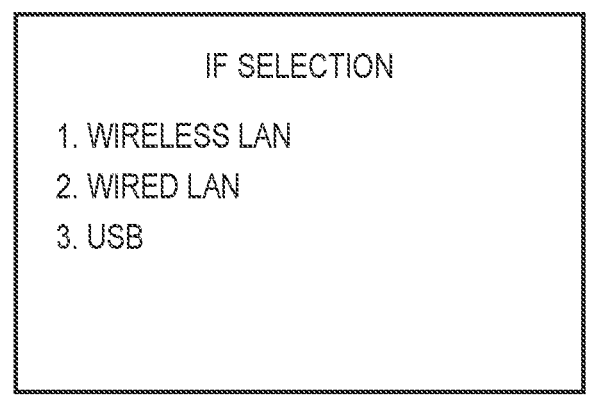
FIG. 12 is a view showing an example of an interface selection screen at the time of initial activation.
Figure 13:
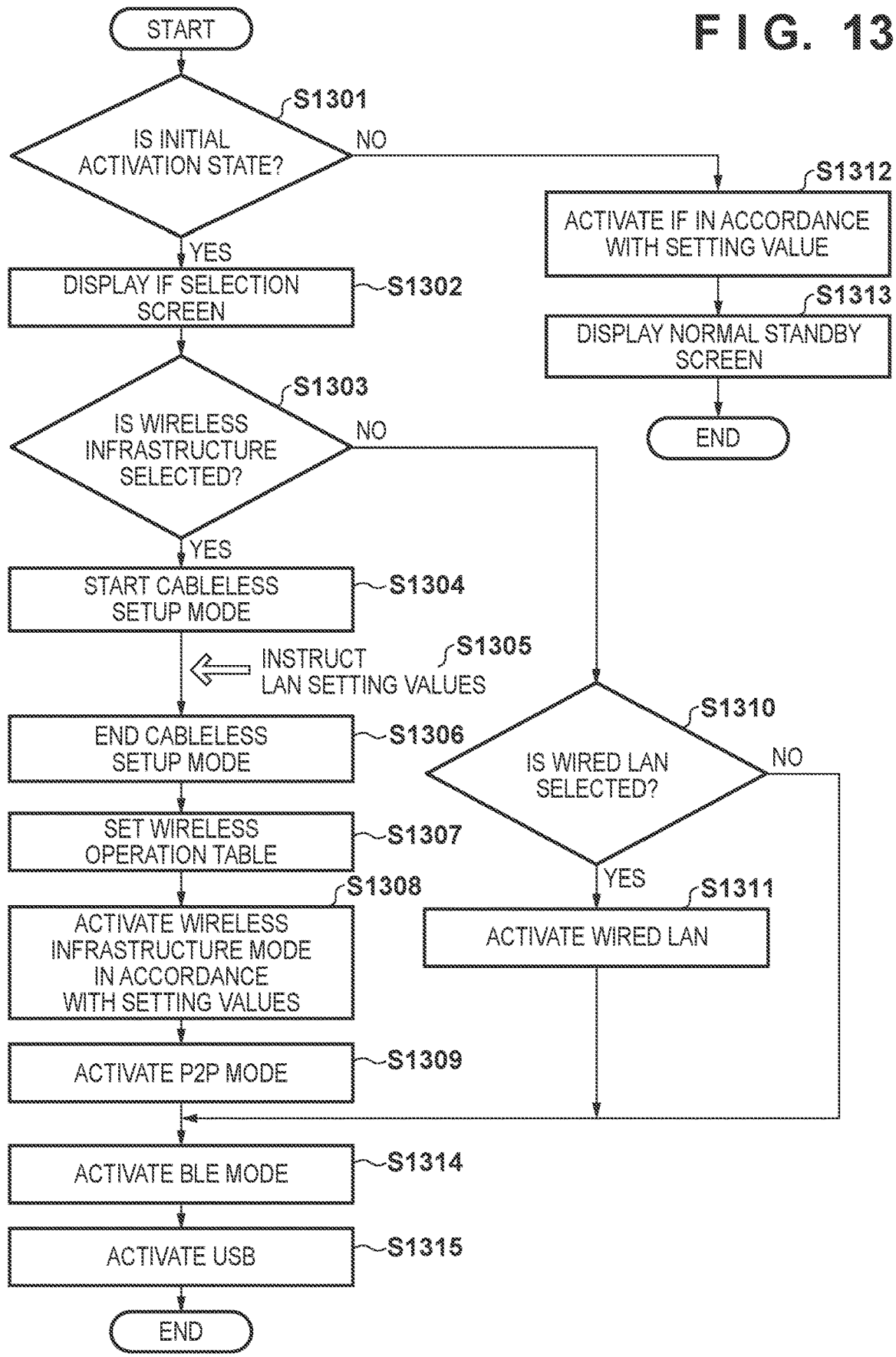
FIG. 13 is a flowchart illustrating an example of the procedure of interface processing at the time of initial activation.

This embodiment pays attention to the fact that the specific processing is performed in the MFP 300 at the time of initial activation, and includes setting of the wireless interface in the processing performed at the time of initial activation. Interface setting processing performed at the time of initial activation of the MFP 300 will be described with reference to FIGS. 12 and 13. Note that an initial setup sequence other than the interface setting is executed at the time of initial activation. However, a description of a sequence that is not directly relevant to this embodiment will be omitted. FIG. 13 shows an example of the procedure of processing executed by the MFP 300. This processing is executed when, for example, the CPU 602 executes the program stored in the ROM 603.

Upon power-on, the MFP 300 determines, by referring to the initial activation flag saved in the nonvolatile memory 605, whether the self-apparatus is in the initial activation state (S1301). The initial activation flag is set to a specific value indicating the initial activation state at the time of factory shipment of the MFP 300. If it is determined that the self-apparatus is not in the initial activation state (NO in step S1301), the MFP 300 activates an interface, for which an active setting is made, in accordance with the active/inactive setting of the interface saved in the nonvolatile memory 605 (S1312). After that, the MFP 300 displays a normal activation standby screen shown in FIG. 4A (S1313), and is set in a standby state for a user operation, thereby ending the processing. Processes in steps S1312 and S1313 correspond to activation processing at the time of normal use of the MFP 300.

On the other hand, if it is determined that the self-apparatus is in the initial activation state (YES in step S1301), the MFP 300 executes a processing sequence when the user activates the MFP 300 for the first time, as indicated by steps S1302 to S1315. In this processing sequence, the MFP 300 displays, on the operation display unit 305, a screen, shown in FIG. 12, for prompting the user to select an IF to be used in the MFP 300 (S1302). The user selects the interface to be used in the MFP 300 from items displayed on the screen. The MFP 300 determines whether the interface selected by the user operation is "wireless LAN" (S1303). If it is determined that "wireless LAN" has not been selected (NO in step S1303), the MFP 300 advances the process to step S1310. If it is determined that a wired LAN has been selected (YES in step S1310), the MFP 300 performs processing of activating the wired LAN (S1311), and advances the process to step S1314. The MFP 300 saves, in the nonvolatile memory 605, setting information indicating that the wired LAN has been activated. This enables the MFP 300 to activate the wired LAN interface with reference to the setting information (S1312) at the time of normal activation (NO in step S1301). The MFP 300 determines whether "wired LAN" has been selected (S1310). If no wired LAN has been selected (NO in step S1310), the MFP 300 advances the process to step S1314. A case in which the process advances from step S1310 to step S1314 without performing the processing in step S1311 corresponds to a case in which neither the wireless LAN nor the wired LAN has been selected and "USB" has been selected. In this case, the MFP 300 activates BLE and USB (S1314 and S1315), and ends the interface setting processing at the time of initial activation. Note that although not shown, if an arrival processing sequence including interface selection ends, the MFP 300 changes the value of the initial activation flag saved in the nonvolatile memory 605 from the value indicating the initial activation state to a value indicating a non-initial activation state. This prevents the initial activation processing sequence from being activated at the next timing when the MFP 300 is powered on, or the like.

Referring back to step S1303, if the MFP 300 determines that the interface selected by the user operation is "wireless LAN" (YES in step S1303), the MFP 300 advances the process to step S1304. In step S1304, the MFP 300 activates a cableless setup mode. The cableless setup mode is a dedicated mode for wireless setting. In the cableless setup mode, the MFP 300 activates the software AP mode to operate as an AP. Thus, an external communication apparatus such as a personal computer, smartphone, or tablet can readily be connected, as a client (slave device), to the MFP 300, and can communicate with the MFP 300. The 2.4- or 5-GHz frequency band is used at the time of a cableless setup. Note that the MFP 300 may determine, based on a peripheral wireless communication status, which of the frequency bands is to be used. If, for example, the MFP 300 determines that wireless communication using the 2.4-GHz band is congested more than that using the 5-GHz band, the software AP may be activated to perform communication using the 5-GHz band. Note that in the cableless setup mode, the software AP mode need not always be used, and for example, the WFD mode may be used instead of using the software AP mode. If, however, WFD is used, it is necessary to include a randomly generated character string in an SSID as a network identifier, and no such restriction is imposed on the software AP, and thus the software AP mode is assumed to be used here. Note that in this embodiment, the terminal apparatus 200 establishes P2P wireless connection to the MFP 300 operating as an AP by the processing in step S1304.

In the cableless setup mode, the MFP 300 accepts input of setting values necessary mainly for connection in the wireless infrastructure mode (S1305). The external communication apparatus such as a personal computer, smartphone, or tablet establishes P2P wireless connection to the MFP 300, and then transmits setting information for the wireless infrastructure mode to the MFP 300 using, for example, a LAN setting-specific application. The LAN setting-specific application operating in the external communication apparatus such as a personal computer, smartphone, or tablet is configured to connect the MFP 300 to the external AP to which the self-apparatus is connected. In one example, the LAN setting-specific application operating in the terminal apparatus 200 is configured to transmit, to the MFP 300 operating as the software AP, wireless setting information concerning the external AP to which the terminal apparatus 200 is currently connected. Note that the LAN setting-specific application can be activated when, for example, the external communication apparatus executes a program stored in a storage medium or the like packaged together with the product of the MFP 300 or a program distributed in a format downloadable via the network.

The wireless setting information received by the MFP 300 from the external communication apparatus includes the SSID of an external AP creating a network which the user wants to join, a frequency band used by the external AP, an encryption method, and an authentication method. Note that the frequency band information can be information for designating the 5- or 2.4-GHz band, a value indicating a wireless channel associated with the frequency band, or the like. Upon receiving the wireless setting information, the MFP 300 ends the cableless setup mode (S1306), stops the software AP mode, and executes the wireless setting processing of the wireless infrastructure mode. Then, in accordance with the wireless setting information received in step S1305, the MFP 300 starts setting of the wireless combo unit 616 (S1307). The wireless combo unit 616 is only one module that performs WLAN communication and BT communication using a common antenna. To enable communication by a plurality of communication interfaces using the common antenna, the MFP 300 sets the priority level of each interface, and sets a period length to be allocated by time-division control based on the priority level. FIGS. 15A, 16A, ..., 23A each show a wireless control setting table to be used for setting in step S1307. Based on the wireless setting information received in step S1305, the MFP 300 specifies which of the 2.4- and 5-GHz band is to be used in the infrastructure mode, and specifies, if the 5-GHz band is used, which of a DFS channel and a non-DFS channel is to be used. Note that DFS is an abbreviation for Dynamic Frequency Selection, and is a function of dynamically changing a channel in accordance with the presence/absence of an interference wave of a weather radar or the like. The DFS channel for which the channel needs to be dynamically changed in accordance with the presence/absence of an interference wave of a weather radar or the like will be referred to as "DFS Ch" hereinafter. In addition, the non-DFS channel for which the channel need not be dynamically changed in accordance with the presence/absence of an interference wave of a weather radar or the like will be referred to as "non-DFS Ch" hereinafter. In accordance with the combination of the wireless setting information received in step S1305, the MFP 300 determines which of the wireless control setting tables shown in FIGS. 15A to 23C is to be used. Details of the wireless control setting tables shown in FIGS. 15A to 23C will be described alter. Numerical values in FIGS. 15A to 23C are merely examples, and other values may be set in accordance with the use method. The MFP 300 sets information of the wireless control setting table extracted based on the wireless setting information received in step S1305, and saves the setting in the nonvolatile memory 605.

The processing, executed in step S1307, in which the MFP 300 determines which of FIGS. 15A, 16A, ..., 23A is to be used will be described with reference to FIG. 14. The MFP 300 obtains, from the wireless setting information received in step S1305, a connection CH setting value of P2P connection in the cableless setup mode and a connection CH (channel) setting value in the wireless infrastructure mode set by the user (S1401). Note that the connection CH setting value in the wireless infrastructure mode is set by operating, by the user, the LAN setting-specific application operating in the terminal apparatus 200. This embodiment assumes that the connection CH setting value of P2P connection is obtained from the wireless setting information received in step S1305 but another method may be used. That is, the MFP 300 saves the connection CH of P2P connection in the cableless setup mode. At the stage of step S1401, the MFP 300 may read out the saved connection CH setting value of P2P connection in the cableless setup mode. Then, the MFP 300 determines whether the connection CH setting value of P2P connection indicates the 2.4- or 5-GHz band (S1402). If the connection CH setting value of P2P connection indicates the 5-GHz band (NO in step S1402), the MFP 300 determines whether the channel is the DFS Ch (S1403). The DFS Ch is generally W53 or W56 in the 5-GHz band, which is defined by the IEEE802.11 standard series. The DFS Ch may include W52 and W58 depending on a country or region. If it is determined that the connection CH setting value of P2P connection indicates no DFS Ch (NO in step S1403), the MFP 300 determines, as the connection CH setting value in P2P mode, information indicating non-DFS Ch in the 5-GHz band (S1404). On the other hand, if it is determined that the connection CH setting value of P2P connection indicates the DFS Ch (YES in step S1403), the MFP 300 determines, as the connection CH setting value in the P2P mode, information indicating the DFS Ch in the 5-GHz band (S1405). If it is determined that the connection CH setting value of P2P connection indicates the 2.4-GHz band (YES in step S1402), the MFP 300 determines, as the connection CH setting value in P2P mode, information indicating the 2.4-GHz band (S1406).

Then, the MFP 300 determines, based on the wireless setting information received in step S1305, whether the connection CH setting value in the wireless infrastructure mode indicates the 2.4- or 5-GHz band (S1407). If the connection CH setting value indicates the 5-GHz band (NO in step S1407), the MFP 300 determines whether the connection CH setting value indicates the DFS Ch or non-DFS Ch (S1408). If it is determined that the connection CH setting value indicates no DFS Ch (NO in step S1408), the MFP 300 determines, as the non-DFS Ch, the connection CH setting value in the wireless infrastructure mode (S1409). On the other hand, if the connection CH setting value indicates the DFS Ch (YES in step S1408), the MFP 300 determines, as the DFS Ch, the connection CH setting value in the wireless infrastructure mode (S1410). If it is determined that the connection CH setting value indicates the 2.4-GHz band (YES in step S1407), the MFP 300 determines, as 2.4 GHZ, the connection CH setting value in the wireless infrastructure mode (S1411).

Then, the MFP 300 refers to the wireless control setting table (S1412) to determine, based on the connection CH setting value in the P2P mode and that in the wireless infrastructure mode determined by the above-described processing, the wireless control setting table to be used. FIGS. 15A to 23C show examples of the determined wireless control setting table. The MFP 300 sets setting values described in the wireless control setting table determined in step S1412 (S1413), and determines the priority levels of the WLAN and BLE and setting values for time-division control.

Referring back to FIG. 13, in step S1308, the MFP 300 activates communication in the wireless infrastructure mode in accordance with the wireless setting information received in step S1305 and the setting values based on the processing in step S1307, and performs connection processing to the external access point 400. Then, the MFP 300 saves the setting in the nonvolatile memory 605 in response to activation of the wireless infrastructure mode. More specifically, information indicating the active state of the wireless infrastructure mode, the SSID of the external AP used in the wireless infrastructure mode, and the like are saved. The MFP 300 activates the setting of the P2P mode based on the frequency band information which is included in the wireless setting information received in step S1305 and transmitted from the external communication apparatus, and the setting values based on the processing in step S1307 (S1309). In response to the activation of the P2P mode, the MFP 300 saves the setting in the nonvolatile memory 605. More specifically, information indicating the active state of the P2P mode, and the frequency band and Ch information used in the P2P mode are saved. Note that if the wireless infrastructure mode and the P2P mode can be operated concurrently, even if the user selects only the wireless infrastructure mode in the setup sequence at the time of initial activation, the MFP 300 can activate the P2P mode based on its own judgement. The MFP 300 can execute a setup to set a state in which the wireless infrastructure mode and the P2P mode automatically operate concurrently. That is, processing of activating the P2P mode and saving the setting may be performed regardless of whether the wireless setting information for activating the P2P mode has been received or not in step S1305. In this case, the frequency band and CH suitable for a region where the wireless LAN is used can be held in advance as initial values in the MFP 300. The MFP 300 activates BLE and USB (S1314 and S1315), and ends the interface setting processing at the time of initial activation. That is, in either of a case in which the wired LAN has been selected and a case in which the wireless LAN has been selected, the BLE mode is activated and the USB interface is activated. Note that the MFP 300 need not activate the BLE mode or the USB interface in accordance with, for example, the setting based on a user operation.

As described above, when the WLAN is selected by an operation on the main body operation unit at the time of initial activation, the MFP 300 performs processing of activating concurrent communication in the wireless infrastructure mode, the P2P mode, and the BLE mode. At this time, the wireless control setting table to be used is determined depending on whether the frequency band used in each of the wireless infrastructure mode and the P2P mode is the 2.4- or 5-GHz band, and, if the frequency band used is the 5-GHz band, also depending on whether the setting channel is the DFS Ch or non-DFS Ch. That is, the wireless control setting table to be used is determined as follows.

infrastructure: 2.4-GHz, P2P: 2.4-GHz→FIGS. 15A to 15C infrastructure: 5-GHz non-DFS Ch, P2P: 2.4-GHz-→FIGS. 16A to 16C infrastructure: 5-GHz DFS Ch, P2P: 2.4-GHz→FIGS. 17A to 17C infrastructure: 2.4-GHz, P2P: 5-GHz non-DFS Ch→FIGS. 18A to 18C infrastructure: 2.4-GHz, P2P: 5-GHz DFS Ch→FIGS. 19A to 19C infrastructure: 5-GHz non-DFS Ch, P2P: 5-GHz non-DFS Ch→FIGS. 20A to 20C infrastructure: 5-GHz DFS Ch, P2P: 5-GHz non-DFS Ch→FIGS. 21A to 21C infrastructure: 5-GHz non-DFS Ch, P2P: 5-GHz DFS Ch→FIGS. 22A to 22C infrastructure: 5-GHz DFS Ch, P2P: 5-GHz DFS Ch→FIGS. 23A to 23C

Note that the MFP 300 can concurrently maintain wireless connections of the patterns described above. For example, the MFP 300 can concurrently maintain wireless connection of the 5-GHz DFS Ch in the wireless infrastructure mode, 2.4-GHz wireless connection in the P2P mode, and wireless connection in the BLE mode. Furthermore, for example, the MFP 300 can concurrently maintain wireless connection of the 5-GHz DFS Ch in the wireless infrastructure mode, wireless connection of the 5-GHz non-DFS Ch in the P2P mode, and wireless connection in the BLE mode.

Upon completion of initial activation, the MFP 300 transitions to the Standby state. The above-described processing at the time of initial activation makes it possible to avoid the above-described restriction caused by the wireless combo unit 616 in the Standby state. Therefore, the MFP 300 can use the common hardware resources to improve the convenience when concurrently operating the P2P mode, the wireless infrastructure mode, and the BLE mode. Note that the BLE mode is inactive, a period allocated to BLE can be distributed in accordance with the ratio between times allocated to the wireless infrastructure mode and the P2P mode in the above-described wireless control setting table. Another wireless control setting table corresponding to a case in which the BLE mode is inactive may be prepared. Similarly, if only one of the wireless infrastructure mode and the P2P mode is active in addition to the BLE mode, the communication period length of each mode may be determined based on the time ratio in the above-described wireless control setting table or another wireless control setting table may be prepared. If no data communication in the BLE mode is performed, the remaining period may be allocated to other modes while maintaining the beacon transmission period for the BLE mode in the above-described wireless control setting table. Furthermore, if another wireless communication mode is active in the wireless combo unit 616, another wireless control setting table including a period associated with the wireless communication mode can be prepared.

<Switching Setting of Active/Inactive State of Interface by LAN Settings>

A method of setting the wireless infrastructure mode and the P2P mode at the time of switching of the active/inactive state of the interface will be described next. The MFP 300 is configured to set, via the cableless setup or the main body operation screen shown in FIG. 4C, the active/inactive state of the interface to be used. Note that the MFP 300 can perform the cableless setup by operating, by the user, the operation screen of the MFP 300. That is, if the user instructs to perform the cableless setup using the operation screen of the MFP 300, the MFP 300 activates the software AP mode, as in step S1304, to operate as the AP. This embodiment assumes that only one of the wired LAN and the wireless LAN is used and the MFP 300 cannot activate the wireless LAN while the wired LAN is active. Similarly, assume that the MFP 300 cannot activate the wired LAN while the wireless LAN is active. Note that the wired LAN and the wireless LAN can be inactivated concurrently. With respect to Bluetooth as well, the communication function is implemented by the wireless combo unit 616 together with the wireless LAN, and thus Bluetooth is not activated while the wired LAN is active. The USB interface cannot be inactivated by the user setting, is always activated at the time of activation, and can be used concurrently with the wired or wireless LAN or BLE. The P2P mode and the wireless infrastructure mode are set for the wireless LAN, and the MFP 300 is configured to individually set the active/inactive state for each mode. The P2P mode and the wireless infrastructure mode can be activated concurrently. That is, the MFP 300 can concurrently maintain wireless connection in the P2P mode and that in the wireless infrastructure mode. Note that the connections can be maintained concurrently but data communications cannot be executed concurrently and are executed sequentially. For example, if wireless connection in the P2P mode and that in wireless infrastructure mode are maintained concurrently, data communication in the wireless infrastructure mode is performed for a predetermined period, and then data communication in the P2P mode is performed. The MFP 300 is configured to set the active/inactive state of the BLE mode independently of the P2P mode and the wireless infrastructure mode of the wireless LAN. At this time, it is possible to activate the BLE mode concurrently with each mode (P2P mode and/or wireless infrastructure mode) of the wireless LAN. That is, the MFP 300 can concurrently maintain wireless connection in each mode of the wireless LAN and that in the BLE mode. Therefore, the MFP 300 can concurrently maintain wireless connection in the P2P mode of the wireless LAN, wireless connection in the wireless infrastructure mode, and wireless connection in the BLE mode. The set active/inactive state is saved in the nonvolatile memory 605, and the MFP 300 refers to the information at the time of next activation after the power is turned off, and activates each interface based on the saved information. If the LAN setting items are initialized, the MFP 300 inactivates the P2P mode, the wireless infrastructure mode, and the BLE mode. In this case, the MFP 300 also inactivates the wired LAN, and is set in a state in which neither the wired LAN nor the wireless LAN is used. If the user initializes the LAN settings, he/she individually changes the setting of a desired interface to the active state, and then uses the MFP 300.

Figure 14:
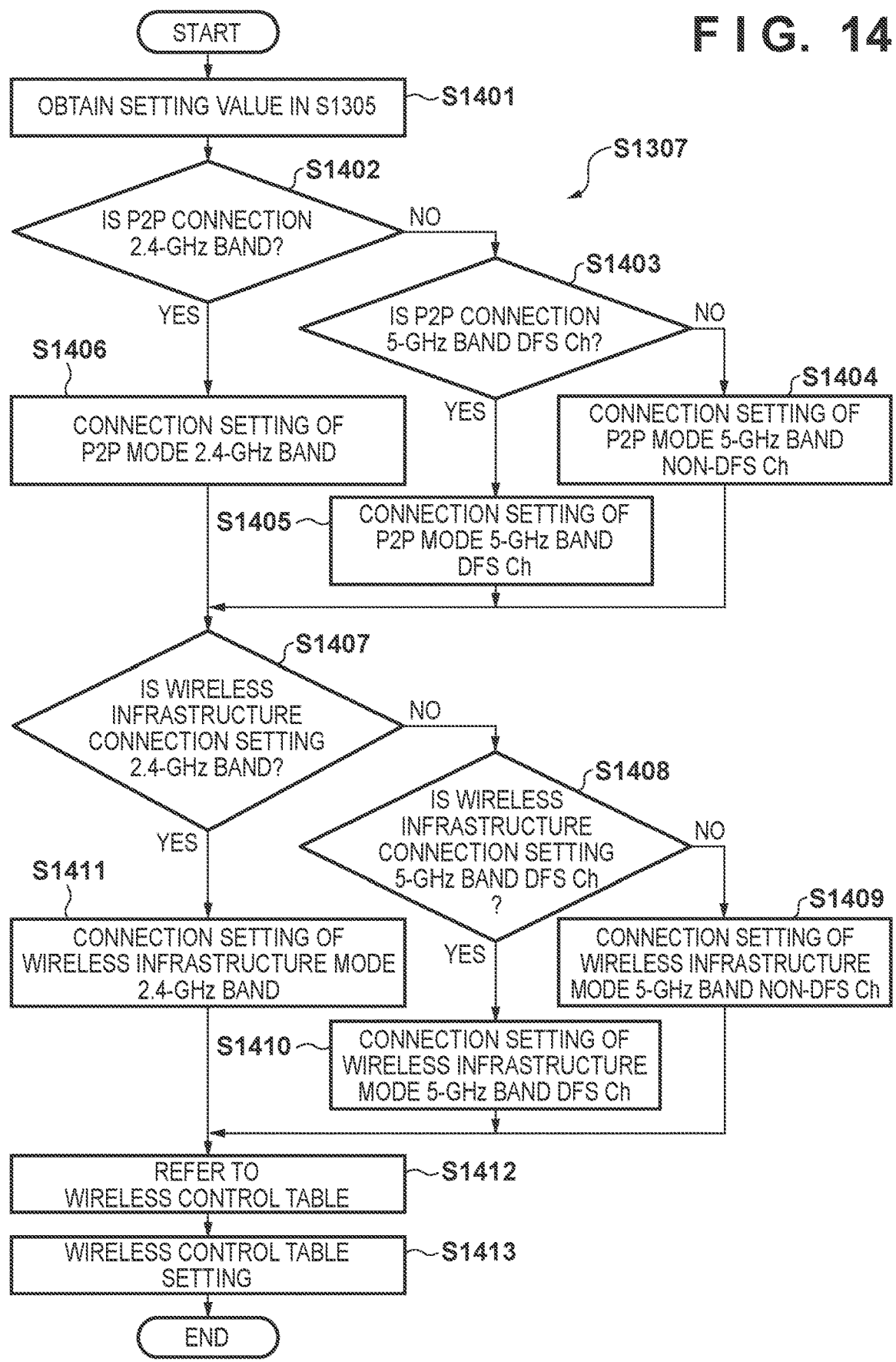
FIG. 14 is a flowchart illustrating an example of the procedure of wireless control setting table setting processing at the time of initial activation.

Then, in response to the change of the setting, as described above, the MFP 300 can execute, for example, processing similar to that shown in FIG. 14, and select the wireless control setting table to be used.

<Explanation of Wireless Control Setting Table>

The wireless control setting table will be described. As described above, FIGS. 15A to 23C each show the wireless control setting table corresponding to the frequency bands and channels used in the wireless infrastructure mode and the P2P mode. Among FIGS. 15A to 23C, FIGS. 15A, 16A, . . . , 23A show Standby tables used when the MFP 300 is in the Standby state (idle state). FIGS. 15B, 16B, . . . , FIG. 23B show wireless infrastructure connection priority tables used when the MFP 300 is in the Print/Scan operation state and transmits/receives print data (or scan data) in the wireless infrastructure mode. FIGS. 15C, 16C, . . . , 23C show P2P connection priority tables used when the MFP 300 is in the Print/Scan operation state and transmits/receives print data (or scan data) in the P2P mode.

An item "priority" in each table is a setting value indicating a priority level for using the common hardware (for example, one CPU and one antenna). In this embodiment, a priority level of 1 (highest priority level) is always set for BLE that needs to send a beacon at a predetermined interval, a priority level of 2 or 3 is set for each of the wireless infrastructure mode and the P2P mode in accordance with a connected channel. Note that in this embodiment, in each of the wireless infrastructure mode and the P2P mode, a priority level when the channel used is the DFS Ch in the 5-GHz band is set higher than that of another channel (the non-DFS Ch in the 2.4- or 5-GHz band). The same priority level is set for the non-DFS CH in the 2.4-GHz band and that in the 5-GHz band. Note that the settings of these priority levels are merely examples, and settings different from the shown ones may be used. As the priority level is higher, communication is more preferentially performed. For example, in the examples shown in FIGS. 19A to 19C, communication in the BLE mode (priority level of 1) is most preferentially executed. Next, communication in the P2P mode (priority level of 2) is preferentially executed. The priority level of communication in the wireless infrastructure mode (priority level of 3) is lowest. That is, in the examples shown in FIGS. 19A to 19C, if a packet received by communication in the P2P mode during communication in the wireless infrastructure mode includes a DFS command, communication in the wireless infrastructure mode is stopped. Then, processing of the DFS command included in the packet received by communication in the P2P mode is executed more preferentially than communication in the wireless infrastructure mode.

An item "time-division occupancy" is a setting value of a communicable time in each of the BLE mode, the wireless infrastructure mode, and the P2P mode in an interval from the start of a beacon transmission period at a predetermined interval (for example, an interval of 100 msec) of BLE until the start of the next beacon transmission period. Communication in each mode is executed during the period set by the time-division occupancy, and communication in other modes is not performed during that period. For example, with reference to the table shown in FIG. 15A, communication in the BLE mode is performed every 100 msec as the beacon transmission interval in the BLE mode. At this time, if there exists data to be communicated other than the beacon in the BLE mode, communication in the BLE mode is performed until that communication is completed. Assume that the communication period in the BLE mode is, for example, 10 msec. After that, 50% of the remaining period of 90 msec is used in each of the wireless infrastructure mode and the P2P mode. That is, a communication period of 45 msec is allocated to each of the wireless infrastructure mode and the P2P mode. With reference to the table shown in FIG. 15B, since Print/Scan data is transmitted/received in the wireless infrastructure mode, much time is allocated to the wireless infrastructure mode. That is, assuming that a communication period in the BLE mode is, for example, 10 msec, 90% (=81 msec) of the remaining period of 90 msec is allocated to the wireless infrastructure mode, and 10% (=9 msec) of the remaining period is allocated to the P2P mode. Similarly, in the case of the table shown in FIG. 15C, 10% (=9 msec) is allocated to the wireless infrastructure mode and 90% (=81 msec) is allocated to the P2P mode. In this way, the communication period in each mode is determined in accordance with the operation state of the MFP 300. Note that a predetermined guard time may be inserted to a period of switching of each mode. The settings of the time-division occupancies are merely examples, and settings different from the shown ones may be used. Note that in the examples shown in FIGS. 15A to 15C, the priority levels of the wireless infrastructure mode and the P2P mode are both "2". Therefore, neither of communications in the modes is prioritized. Even if, for example, communication in the P2P mode is required during communication in the wireless infrastructure mode, communication in the wireless infrastructure mode is continued.

As described above, separate tables are prepared in correspondence with the operation states of the MFP 300, and the priority level and the time-division occupancy are set for each mode, thereby determining a period during which the common hardware is used for communication in each of the plurality of modes. This can prevent or suppress a situation in which the communication interval and the communication speed are unstable depending on the operation state, and concurrently execute communication in a mode of performing communication at a predetermined interval and a mode requiring high-speed communication depending on the operation state.

<Change of Wireless Control Setting Table by Switching Operation State>

A method of switching, when the operation state of the MFP 300 transitions, the wireless control setting table used will be described with reference to FIG. 24. Processing shown in FIG. 24 is executed when, for example, the CPU 602 of the MFP 300 executes the program stored in the ROM 603 if the operation state of the MFP 300 transitions by a user operation.

Figure 24:
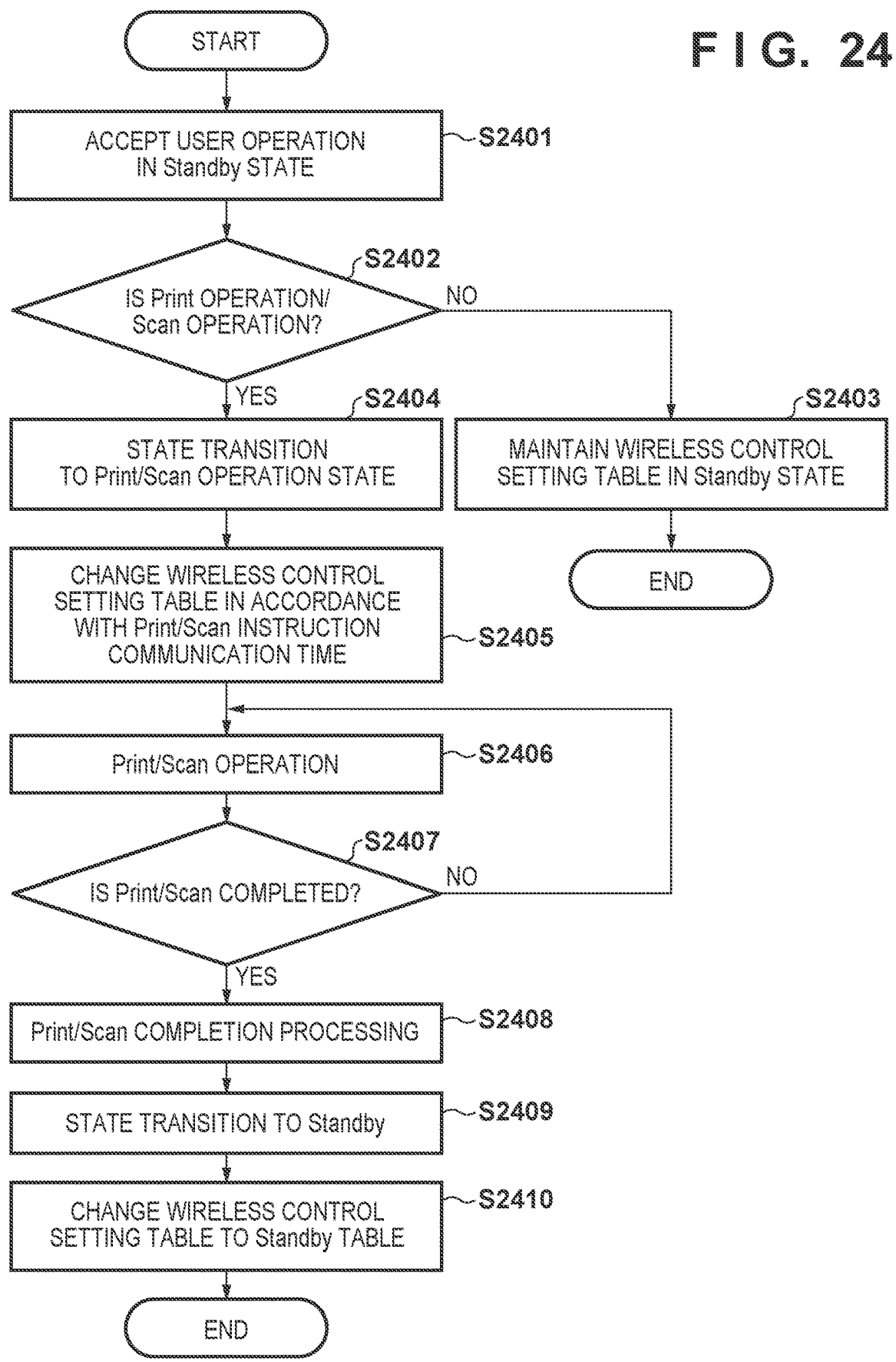
FIG. 24 is a flowchart illustrating an example of the procedure of state transition and wireless control setting table change processing by a user operation.

This processing assumes that the state of the MFP 300 before the processing shown in FIG. 24 starts is the Standby state. When the user operates the communication partner apparatus (for example, the terminal apparatus 200), the MFP 300 accepts the user operation via communication in one of the modes (S2401). At this time, the MFP 300 refers to the Standby table, and can perform communication in each mode during a communication period set in the table. Therefore, the MFP 300 can receive, from the partner apparatus (terminal apparatus 200), a signal indicating the user operation. Then, the MFP 300 determines whether contents of the user operation correspond to a Print/Scan operation (S2402). That is, the MFP 300 determines whether the signal received from the terminal apparatus 200 indicates a print instruction or a scan instruction. If it is determined that the contents of the user operation correspond to an operation other than the Print/Scan operation (NO in step S2402), the MFP 300 accepts the user operation without changing the Standby table (S2403), and ends the processing shown in FIG. 24. That is, in this case, the MFP 300 determines that the apparatus state concerning communication is not changed by the user operation, and is maintained in the Standby state. On the other hand, if the contents of the user operation correspond to the Print/Scan operation (YES in step S2402), the MFP 300 transitions to a Print/Scan operation state (S2404). In accordance with the state after transition and which of communication in the wireless infrastructure, that in the P2P mode, and that in the BLE mode is used to instruct the Print/Scan operation, the MFP 300 changes the wireless control setting table used (S2405). Then, the MFP 300 transmits/receives Print/Scan data to/from the partner apparatus (terminal apparatus 200) using setting information corresponding to the priority level and the time-division occupancy in the changed wireless control setting table (S2406). The transmission/reception processing is repeated until all the data are transmitted/received (NO in step S2407, and step S2406). If data transmission/reception is complete (YES in step S2407), the MFP 300 executes Print/Scan completion processing (S2408), and prepares next state transition. The Print/Scan completion processing is the same as processing performed by a general MFP, and a detailed description thereof will be omitted. After the Print/Scan completion processing, the MFP 300 causes the operation state to transition to the Standby state (S2409), and changes the wireless control setting table used to the Standby table corresponding to the current wireless settings (S2410).

Figure 25:
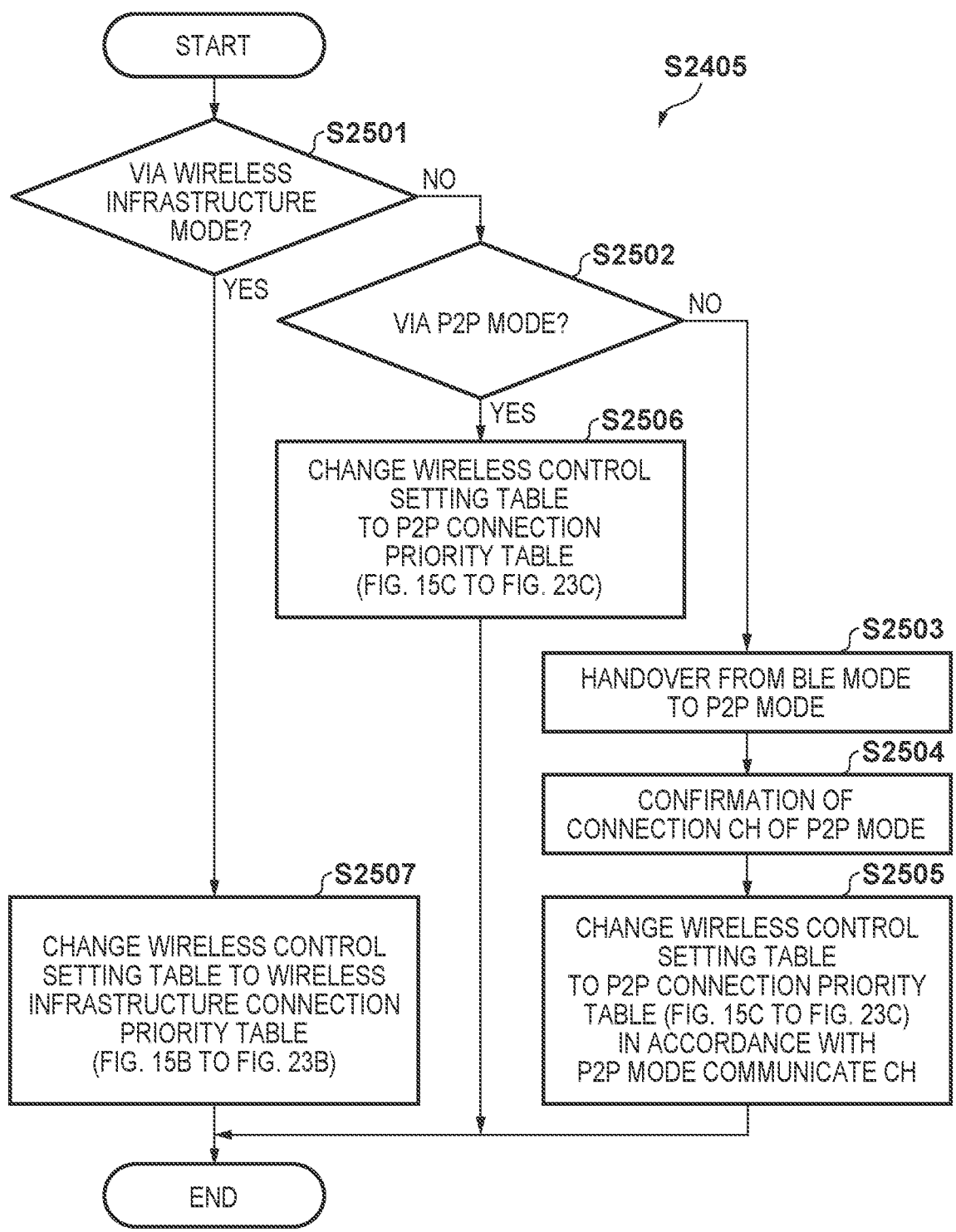
FIG. 25 is a flowchart illustrating an example of the procedure of wireless control setting table change determination processing.

The processing of changing the wireless control setting table in step S2405 will now be described with reference to FIG. 25. In this processing, the MFP 300 determines which of communication in the wireless infrastructure mode, that in the P2P mode, and that in the BLE mode has been used to receive the Print/Scan execution instruction (S2501 and S2502). If it is determined that communication in the BLE mode has been used to receive the execution instruction (NO in step S2501 and NO in step S2502), the MFP 300 performs a handover for performing communication with the communication partner apparatus (terminal apparatus 200) in the P2P mode (S2503). The terminal apparatus 200 receives wireless connection information (SSID, password, and the like) of the software AP in the MFP 300 via BLE communication. Furthermore, the terminal apparatus 200 instructs, via BLE communication, the MFP 300 to activate the software AP. If the software AP activation instruction is received via BLE, the MFP 300 confirms and sets the connection channel in the P2P mode (S2504). The MFP 300 sets, as the wireless control setting table to be used, the P2P connection priority table among the wireless control setting tables corresponding to the setting value (S2505). For example, a case will be described, in which the MFP 300 is set to perform 2.4-GHz communication in the wireless infrastructure mode and the software AP activated by the instruction via BLE is set to use the 5-GHz non-DFS Ch. In this case, the MFP 300 sets FIG. 18C in step S2505. Furthermore, for example, a case will be described, in which the MFP 300 is set to perform communication in the 5-GHz DFS Ch for the wireless infrastructure mode and the software AP activated by the instruction via BLE is set to use the 2.4-GHz band. In this case, the MFP 300 sets FIG. 17C. Note that P2P connection is established between the terminal apparatus 200 and the software AP in the MFP 300 activated by the instruction via BLE. To establish this P2P connection, the terminal apparatus 200 establishes wireless connection using the wireless connection information (SSID, password, and the like) received by BLE communication. Thus, only an operation instruction is performed without transmitting/receiving Print/Scan data by communication in the BLE mode, and the Print/Scan data is transmitted/received in the P2P mode. At this time, since the appropriate wireless control setting table is set in accordance with the setting of the infrastructure mode and that of the P2P mode, it is possible to efficiently transmit/receive Print/Scan data. If it is determined that user operation information has been received by communication in the P2P mode (NO in step S2501 and YES in step S2502), the MFP 300 sets, as the wireless control setting table to be used, the P2P connection priority table corresponding to the already held current connection setting information (S2506). If it is determined that the user operation information has been received by communication in the wireless infrastructure mode (YES in step S2501), the MFP 300 sets, as the wireless control setting table to be used, the wireless infrastructure connection priority table corresponding to the already held current connection setting information (S2507). This set table information is saved in the nonvolatile memory 605.

<Data Transmission/Reception for Each Wireless Control Setting Table>

An overview of communication executed based on the above-described wireless control setting table set based on the operation state of the MFP 300 will be described with reference to FIGS. 26A to 26D and 27A to 27D. FIGS. 26A to 26D each show an example of an operation when the MFP 300 receives data. FIGS. 27A to 27D each show an example of an operation when the MFP 300 transmits data. FIGS. 26A to 26D and 27A to 27D each show a case in which a beacon is periodically transmitted by BLE communication. Referring to FIGS. 26A to 26D and 27A to 27D, a packet represented by a hollow rectangle corresponds to a packet transmitted by the MFP 300 and a packet represented by a hatched rectangle corresponds to a packet received by the MFP 300. The abscissa represents a lapse of time.

Figure 26A:
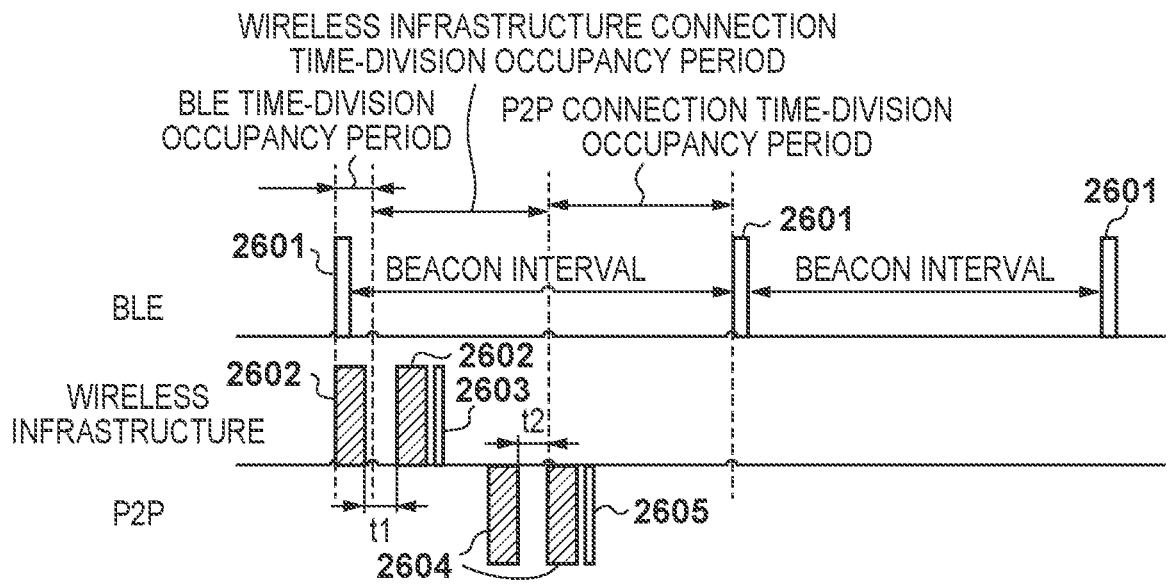
FIG. 26A is a view showing an example of a data reception operation.

FIG. 26A shows a beacon transmission operation in the BLE mode and data packet reception operations in the wireless infrastructure mode and the P2P mode based on the Standby table. Referring to FIG. 26A, a packet 2601 indicates a beacon transmitted in the BLE mode by the MFP 300. A BLE beacon is transmitted at a predetermined time period indicated by a beacon interval. A packet 2602 indicates a data packet received in the wireless infrastructure mode by the MFP 300. If it is determined that the data packet is a normal packet, the MFP 300 transmits an ACK packet (packet 2603). Assume that at the timing of transmitting the BLE beacon (packet 2601) by the MFP 300, the data packet (packet 2602) in the wireless infrastructure mode arrives at the MFP 300. However, in this case, since the current time is in a communication period allocated to the BLE mode in accordance with the priority levels shown in FIGS. 15A to 23C, the MFP 300 transmits the beacon (packet 2601) in the BLE mode, and ignores the packet 2602 in the wireless infrastructure mode. Note that in FIGS. 26A to 26D and 27A to 27D, the communication period of the BLE mode is represented as "BLE time-division occupancy period". Therefore, the reception processing of the packet 2602 does not occur, and no ACK packet (packet 2603) is transmitted accordingly. Thus, the partner apparatus (for example, the access point 400) can receive no ACK packet, and retransmits the packet 2602. Note that in communication control complying with the WLAN communication standard, when retransmitting the data packet since no ACK packet is received, it is necessary to retransmit the data packet after a lapse of a predetermined time ("t1" in FIGS. 26A and 26C) since the last packet transmission. By performing (repeating, in some cases) retransmission in this way, the packet 2602 is transmitted during the communication period allocated to the wireless infrastructure mode in the MFP 300, and the MFP 300 can thus receive the packet 2602.

At this time, since the MFP 300 has not received information concerning the Print/Scan operation, it sets the communication periods of the BLE mode, wireless infrastructure mode, and P2P mode in accordance with the time-division occupancies defined in the Standby table. For example, if the MFP 300 is set to perform 2.4-GHz communication for communication in the wireless infrastructure mode and that in the P2P mode, reference is made to FIG. 15A. That is, in the example shown in FIG. 15A, 50% of the remaining period after communication in the BLE mode is completed is allocated as each of the communication periods of the wireless infrastructure mode and the P2P mode. If, for example, reference is made to FIG. 15A, the MFP 300 does not perform beacon transmission in the BLE mode or processing for the packet received in the P2P mode during the communication period of the wireless infrastructure mode. Therefore, even if a packet 2604 in the P2P mode arrives during the communication period of the wireless infrastructure mode, the MFP 300 ignores it. In this case, since the communication partner apparatus (terminal apparatus 200) in the P2P mode receives no ACK packet after transmitting the packet 2604, it retransmits the packet 2604. This retransmission processing is also performed after a lapse of a predetermined time ("t2" in FIG. 26A) since the last packet transmission in accordance with communication control complying with the WLAN communication standard. By performing (repeating, in some cases) retransmission in this way, the packet 2604 is transmitted during the communication period allocated to the P2P mode in the MFP 300, and the MFP 300 can thus receive the packet 2604. Then, if reception of the packet 2604 succeeds, the MFP 300 transmits an ACK packet (packet 2605) to the partner apparatus (terminal apparatus 200). Note that in FIGS. 26A to 26D and 27A to 27D, the communication period of the wireless infrastructure mode is represented as "wireless infrastructure connection time-division occupancy period" and the communication period of the P2P mode is represented as "P2P connection time-division occupancy period".

A status in which the MFP 300 is set to perform communication by the 5-GHz DFS Ch for communication in the wireless infrastructure mode and communication in the 2.4-GHz band for communication in the P2P mode will now be described. In this case, reference is made to FIG. 17A. Referring to FIG. 17A, the priority level of the wireless infrastructure mode is higher than that of the P2P mode. Therefore, the MFP 300 receives the packet in the wireless infrastructure mode during the communication period allocated to the P2P mode, and determines whether the packet includes a DFS command. If it is determined that the packet includes a DFS command, the MFP 300 executes processing based on the DFS command of the wireless infrastructure mode in preference to processing based on the packet in the P2P mode. Note that the MFP 300 reads out Ch information designated by the DFS command, and holds it in the memory. After that, the MFP 300 restarts the processing based on the packet in the P2P mode. Then, when operating in the wireless infrastructure mode next, the MFP 300 executes communication processing in the wireless infrastructure mode using the Ch information designated by the DFS command and saved in the memory. Note that in this case, if the MFP 300 determines that the packet in the wireless infrastructure mode, received during the communication period allocated to the P2P mode, includes no DFS command, the packet is ignored. Then, the processing based on the packet received by communication in the P2P mode is preferentially executed.

Figure 26B:
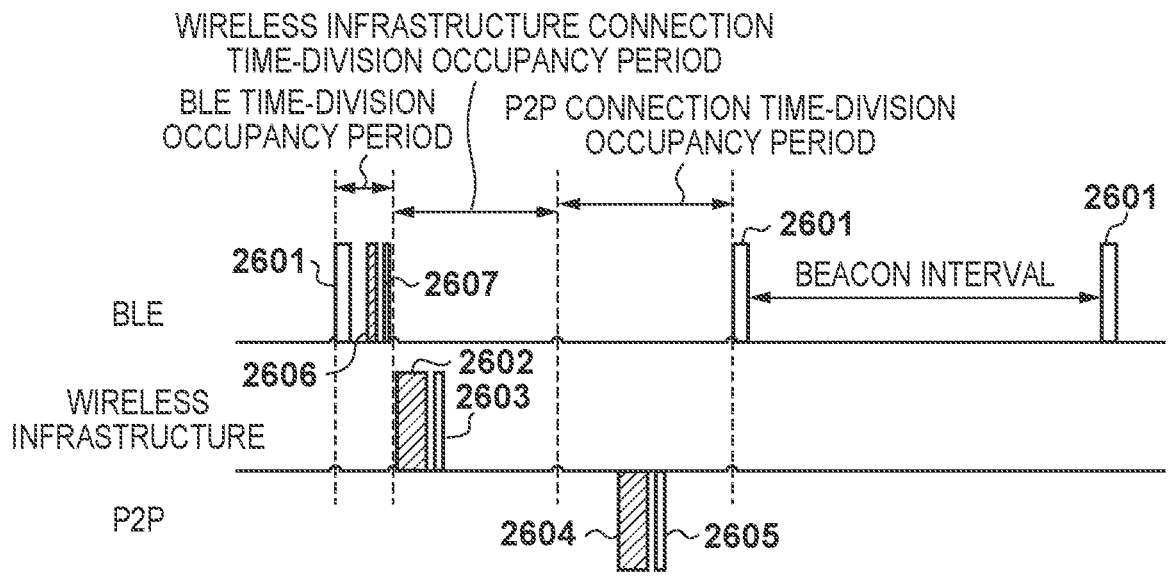
FIG. 26B is a view showing another example of the data reception operation.

If the operation state of the MFP 300 is constant and no BLE data packet is received during the communication period of the BLE mode, the communication periods of the wireless infrastructure mode and the P2P mode in the MFP 300 are constant within a predetermined period defined by the beacon period. On the other hand, if a data packet other than a beacon is received during the communication period of the BLE mode, the lengths of the communication periods of the wireless infrastructure mode and the P2P mode in the MFP 300 change accordingly. FIG. 26B shows an example of a communication operation when communication of data other than the beacon occurs in the BLE mode in the Standby table. The MFP 300 sets, as a BLE communication period, a specific period after the start of beacon transmission. If, for example, a request packet 2606 is received from the terminal apparatus 200 with respect to the beacon (packet 2601) during the communication period, the MFP 300 analyzes the request packet 2606, and transmits a response packet 2607 as a response signal. At this time, the MFP 300 extends the communication period of the BLE mode until communication with the terminal apparatus 200 is completed. In this case, the length of the period obtained by excluding the communication period of the BLE mode, of the predetermined period corresponding to the beacon period, decreases by the extended period of the communication period of the BLE mode, and the communication periods of the wireless infrastructure mode and the P2P mode are shortened accordingly. The MFP 300 distributes, to the wireless infrastructure mode and the P2P mode, the remaining period obtained by subtracting the communication period length of the BLE mode from the beacon period in accordance with the ratio between the time-division occupancies designated in the wireless control setting table, and then sets the communication periods of the respective modes. Note that the processing shown in FIG. 26B can be performed when, for example, the MFP 300 receives the user operation information indicating the Print/Scan operation by communication in the BLE mode in FIG. 25 (NO in step S2501 and NO in step S2502).

Figure 26C:
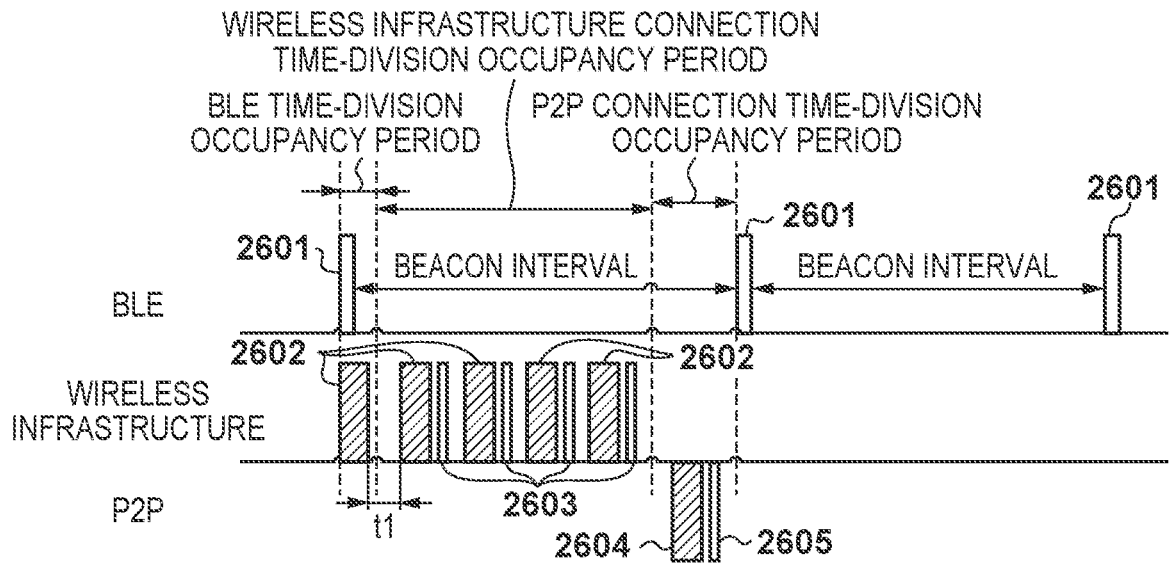
FIG. 26C is a view showing still another example of the data reception operation.

FIG. 26C shows a beacon transmission operation in the BLE mode and data packet reception operations in the wireless infrastructure mode and the P2P mode based on the wireless infrastructure connection priority table. The basic operation is similar to those shown in FIGS. 26A and 26B. If the wireless infrastructure connection priority table is set, the MFP 300 sets the period length of the communication period of the wireless infrastructure mode to be relatively longer than the period length of the communication period of the P2P mode in the remaining period after ensuring the communication period of the BLE mode. This allows the MFP 300 to sufficiently ensure the communication speed in communication with the access point 400 in the wireless infrastructure mode while maintaining periodic beacon transmission. Note that processing shown in FIG. 26C can be performed when, for example, the MFP 300 receives the user operation information indicating the Print/Scan operation by communication in the wireless infrastructure mode in FIG. 25 (YES in step S2501).

Figure 26D:
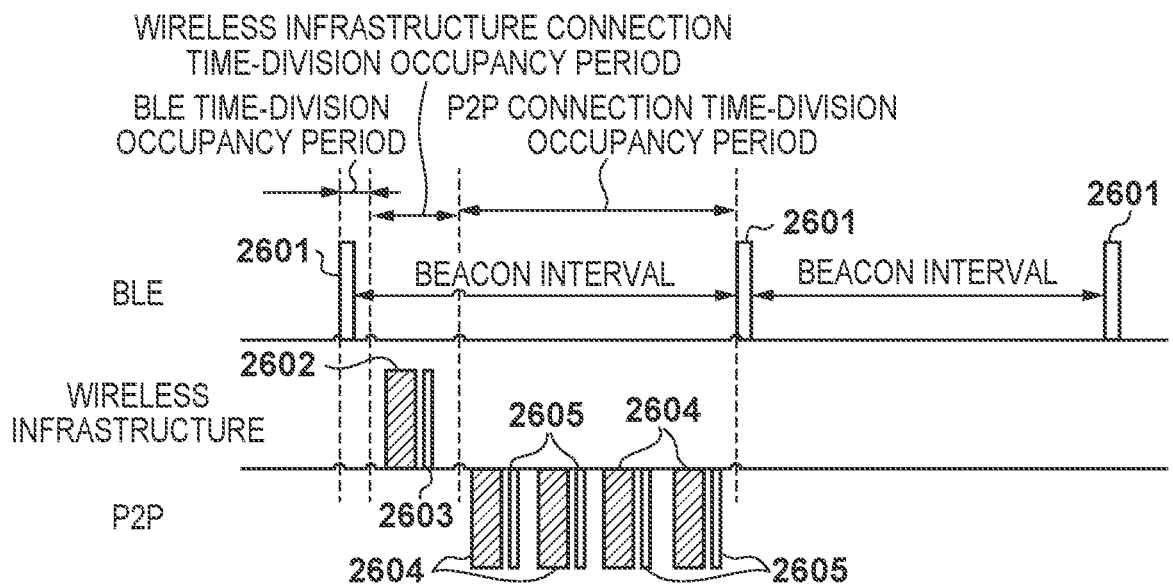
FIG. 26D is a view showing still another example of the data reception operation.

FIG. 26D shows a beacon transmission operation in the BLE mode and data packet reception operations in the wireless infrastructure mode and the P2P mode based on the P2P connection priority table. The basic operation is similar to those shown in FIGS. 26A and 26B. If the P2P connection priority table is set, the MFP 300 sets the period length of the communication period of the P2P mode to be relatively longer than the period length of the communication period of the wireless infrastructure mode in the remaining period after ensuring the communication period of the BLE mode. This allows the MFP 300 to sufficiently ensure the communication speed in communication with the terminal apparatus 200 in the P2P mode while maintaining periodic beacon transmission. Note that processing shown in FIG. 26D can be performed when, for example, the MFP 300 receives the user operation information indicating the Print/Scan operation by communication in the P2P mode in FIG. 25 (NO in step S2501 and YES in step S2501).

Figure 27A:
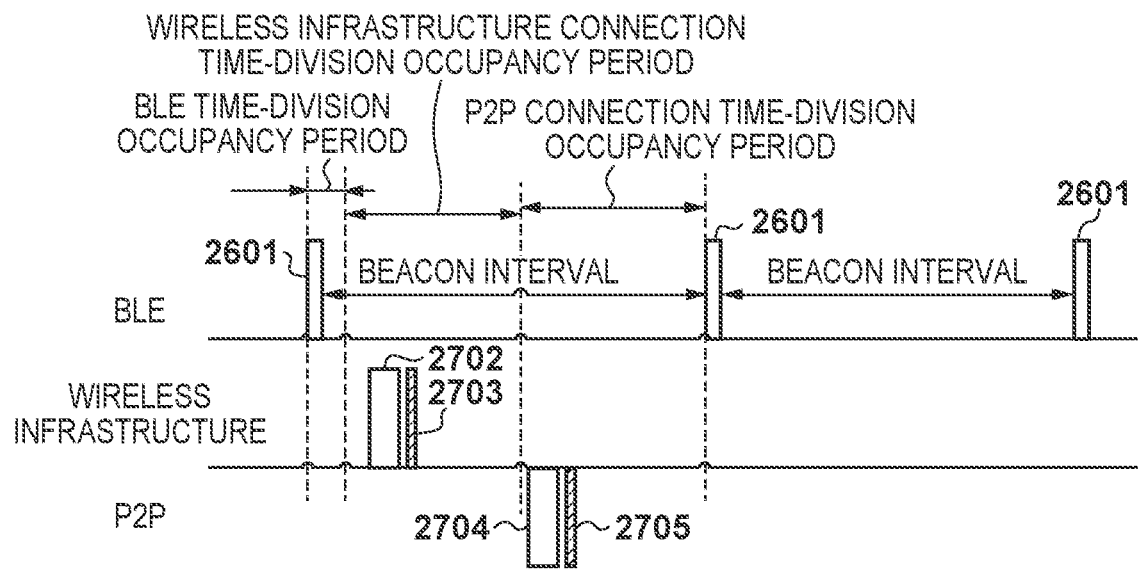
FIG. 27A is a view showing an example of a data transmission operation.

FIG. 27A shows a beacon transmission operation in the BLE mode and data packet transmission operations in the wireless infrastructure mode and the P2P mode based on the Standby table. In this example, the MFP 300 sets the communication periods of the BLE mode, wireless infrastructure mode, and P2P mode in accordance with the time-division occupancies set in the Standby table. Similar to the case shown in FIG. 26A, the MFP 300 periodically transmits the beacon (packet 2601). Then, the MFP 300 transmits a packet 2702 to the communication partner apparatus (access point 400) in the wireless infrastructure mode during the communication period of the wireless infrastructure mode.

If the communication partner apparatus correctly receives the packet 2702, it transmits an ACK packet 2703, and the MFP 300 receives the ACK packet 2703. Note that during the communication period of the BLE mode, even if there is no transmission target data, the MFP 300 waits for the expiration of the period, and then executes signal transmission in the wireless infrastructure mode. Similar to signal transmission in the wireless infrastructure mode, the MFP 300 transmits a packet 2704 in the P2P mode, and receives an ACK packet 2705. During the communication period of the wireless infrastructure mode, even if there is no transmission target data, the MFP 300 waits for the expiration of the period, and then executes signal transmission in the P2P mode. Note that in the P2P mode, the transmission destination of the packet 2704 is the terminal apparatus 200 and the ACK packet 2705 is received from the terminal apparatus 200.

Figure 27B:
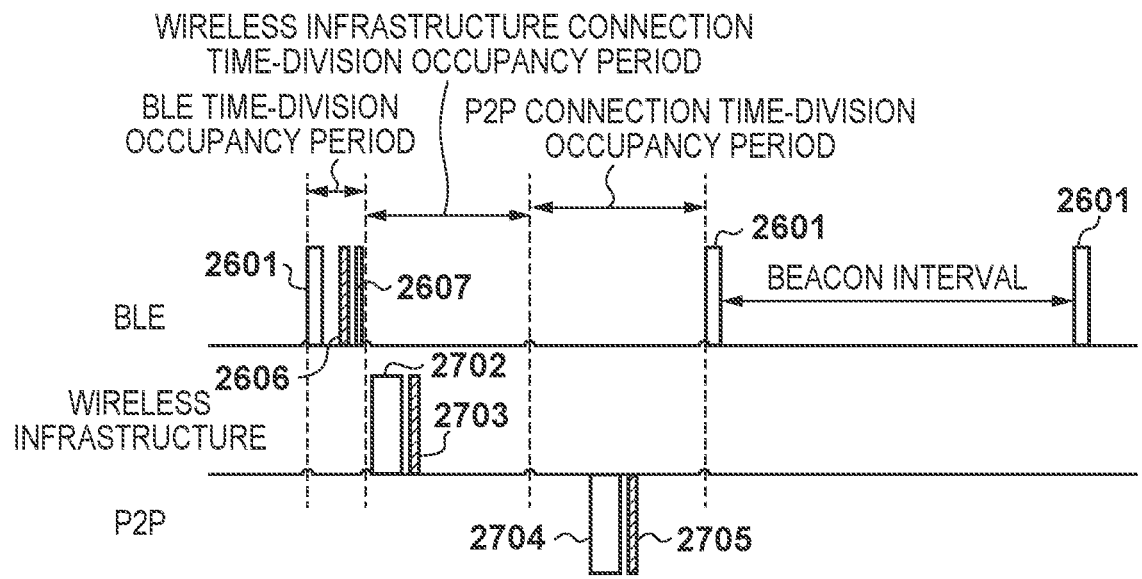
FIG. 27B is a view showing another example of the data transmission operation.

FIG. 27B shows an example of a communication operation when communication of data other than the beacon occurs in the BLE mode in the Standby table. The MFP 300 sets, as a BLE communication period, a specific period after the start of beacon transmission. If, for example, the request packet 2606 is received from the terminal apparatus 200 with respect to the beacon (packet 2601) during the communication period, the MFP 300 analyzes the request packet 2606, and transmits the response packet 2607 as a response signal. The above processing is the same as in FIG. 26B. At this time, the MFP 300 extends the communication period of the BLE mode until communication with the terminal apparatus 200 is completed. In this case, the length of the period obtained by excluding the communication period of the BLE mode, of the predetermined period corresponding to the beacon period, decreases by the extended period of the communication period of the BLE mode, and the communication periods of the wireless infrastructure mode and the P2P mode are shortened accordingly. The MFP 300 distributes, to the wireless infrastructure mode and the P2P mode, the remaining period obtained by subtracting the communication period length of the BLE mode from the beacon period in accordance with the ratio between the time-division occupancies designated in the wireless control setting table, and then sets the communication periods of the respective modes.

Figure 27C:
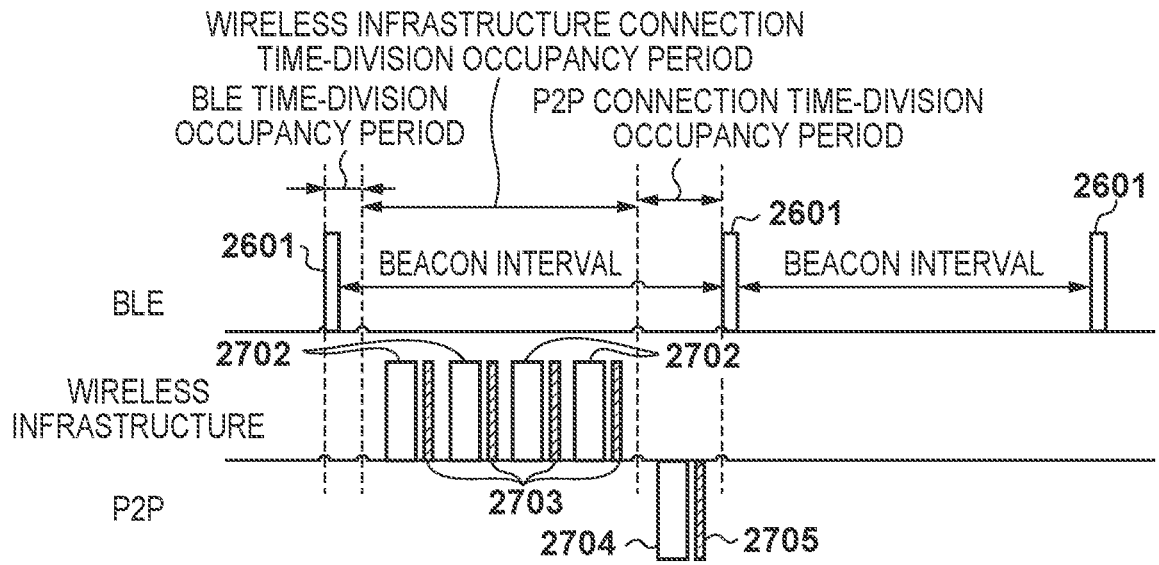
FIG. 27C is a view showing still another example of the data transmission operation.

FIG. 27C shows a beacon transmission operation in the BLE mode and data packet transmission operations in the wireless infrastructure mode and the P2P mode based on the wireless infrastructure connection priority table. The basic operation is similar to those shown in FIGS. 27A and 27B. If the wireless infrastructure connection priority table is set, the MFP 300 sets the period length of the communication period of the wireless infrastructure mode to be relatively longer than the period length of the communication period of the P2P mode in the remaining period after ensuring the communication period of the BLE mode. This allows the MFP 300 to sufficiently ensure the communication speed in communication with the access point 400 in the wireless infrastructure mode while maintaining periodic beacon transmission.

Figure 27D:
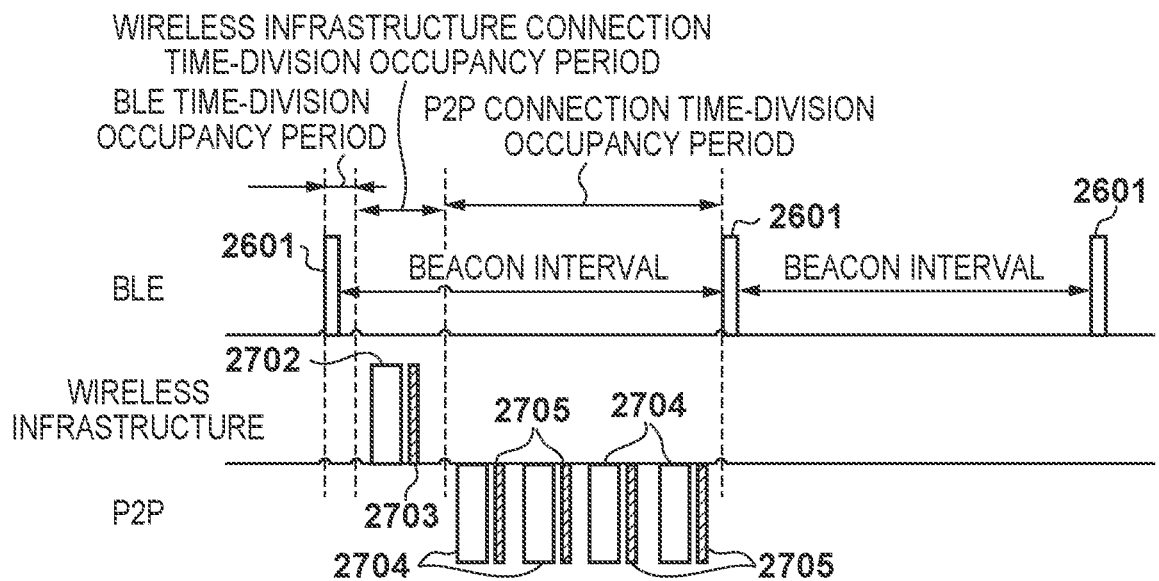
FIG. 27D is a view showing still another example of the data transmission operation.

FIG. 27D shows a beacon transmission operation in the BLE mode and data packet reception operations in the wireless infrastructure mode and the P2P mode based on the P2P connection priority table. The basic operation is similar to those shown in FIGS. 27A and 27B. If the P2P connection priority table is set, the MFP 300 sets the period length of the communication period of the P2P mode to be relatively longer than the period length of the communication period of the wireless infrastructure mode in the remaining period after ensuring the communication period of the BLE mode. This allows the MFP 300 to sufficiently ensure the communication speed in communication with the terminal apparatus 200 in the P2P mode while maintaining periodic beacon transmission.

<Extension of BLE Time-Division Occupancy Period and Calculation Processing of Other Occupancy Periods>

As described above, if only the beacon is sent in the BLE mode, the communication period length of the BLE mode is constant and the communication period lengths of the wireless infrastructure mode and the P2P mode are also constant in accordance with the wireless control setting table in use. However, as generally described with reference to FIGS. 26B and 27B, if the data transmission/reception operation in the BLE mode starts, the communication period of the BLE mode may need to be extended. In this case, the procedure of processing of determining to extend the communication period of the BLE mode and transiting, when the communication period is extended, from the BLE mode to another mode will be described with reference to FIG. 28.

The MFP 300 periodically transmits the beacon in the BLE mode (S2801). Then, after completion of transmission of the packet 2601, the MFP 300 starts a beacon interval timer for transmitting the packet 2601 at a predetermined interval (S2802). The MFP 300 determines whether the current time is in the communication period of the BLE mode (S2803). If it is determined that the current time is in the communication period of the BLE mode (YES in step S2803), the MFP 300 determines whether a request packet is received from the communication partner apparatus (for example, the terminal apparatus 200) in the BLE mode (S2804). If, in a state in which no request packet is received from the terminal apparatus 200 (NO in step S2804), the communication period of the BLE mode expires (YES in step S2803), the MFP 300 ends the processing shown in FIG. 28. In this case, since the communication period of the BLE mode is not extended, with respect to the communication periods of the wireless infrastructure mode and the P2P mode as well, the communication periods set when reference is made to the wireless control setting table for the first time are maintained. If the MFP 300 receives a request packet from the terminal apparatus 200 (YES in step S2804), it turns on an extension flag of the communication period of the BLE mode (S2805). While the extension flag of the communication period of the BLE mode is ON, the MFP 300 does not transition to the communication period of the wireless infrastructure mode or the P2P mode even if the set communication period of the BLE mode is exceeded. After that, every time the MFP 300 transmits the response packet 2607 or receives the request packet 2606, it determines whether to continue communication in the BLE mode (S2807). If communication in the BLE mode is incomplete and is continued (YES in step S2807), the MFP 300 determines whether to continue measurement since the beacon interval timer has not reached a predetermined time (S2808). That is, the MFP 300 determines whether the current time is a timing of transmitting the next BLE beacon. If it is determined that the beacon interval timer has reached the predetermined time and the current time is a timing of transmitting the next beacon (NO in step S2808), the MFP 300 turns off the extension flag of the communication period of the BLE mode (S2809). Then, the MFP 300 returns the process to step S2801, and repeats the series of processes from the beacon transmission processing. If it is determined that the beacon interval timer has not reached the predetermined time and the current time is not a timing of transmitting the next beacon (YES in step S2808), the MFP 300 returns the process to step S2806, and continues communication in the BLE mode. If it is determined that communication in the BLE mode is complete and is not continued (NO in step S2807), the MFP 300 turns off the extension flag of the communication period of the BLE mode (S2810). Subsequently, the MFP 300 calculates the difference between the predetermined time of the beacon interval timer and the current elapsed time of the beacon interval timer, and specifies the remaining time until the next beacon is sent (S2811). Then, the MFP 300 calculates the communication period lengths of the wireless infrastructure mode and the P2P based on the specified remaining time and the time-division occupancy of the wireless infrastructure mode in the currently set wireless control setting table (S2812 and S2813). The MFP 300 specifies new communication periods based on the communication period lengths of the wireless infrastructure mode and the P2P mode calculated in steps S2812 and S2813, and updates the setting values of the communication periods.

Figure 28:
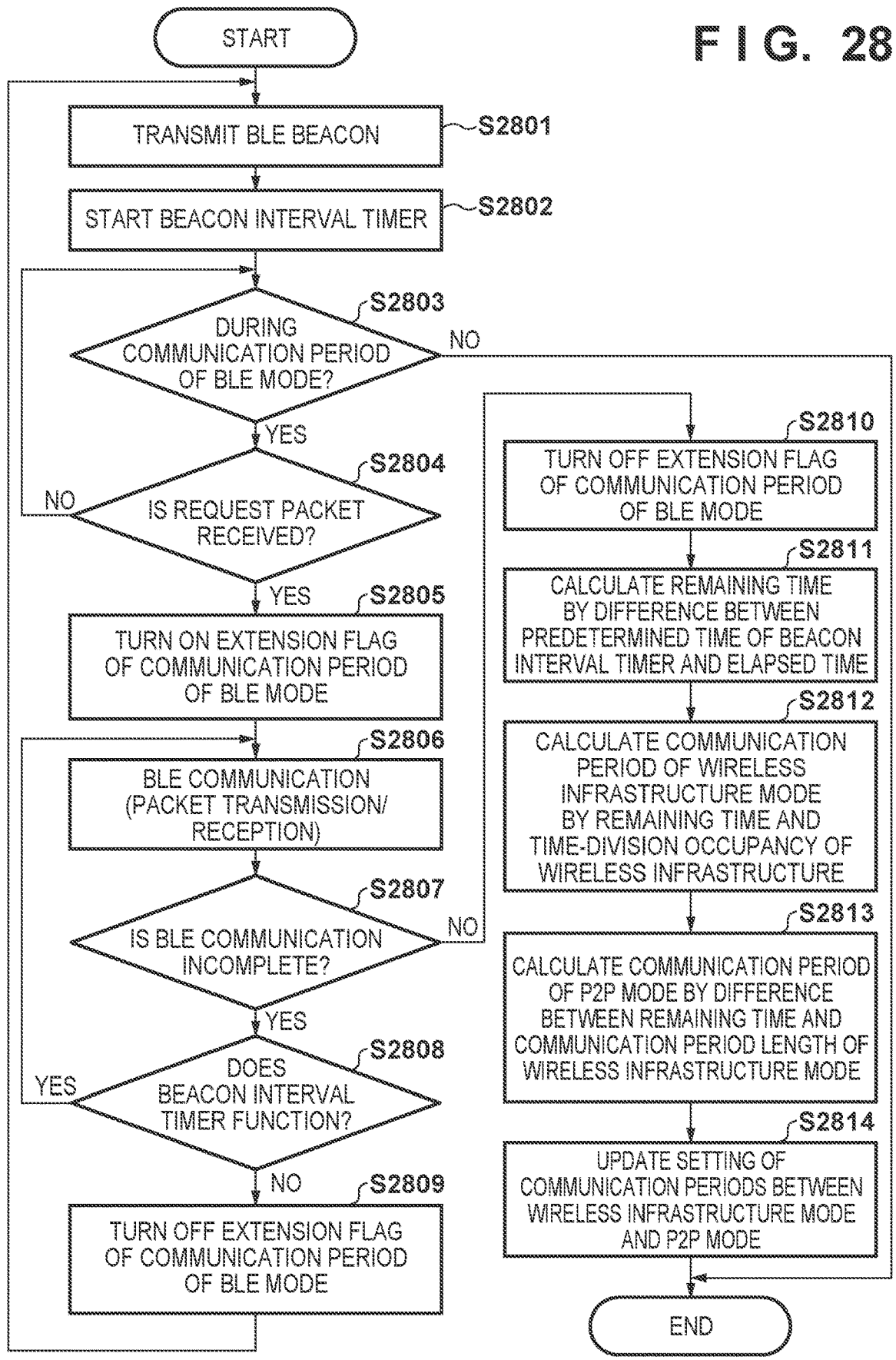
FIG. 28 is a flowchart illustrating communication period setting processing.

By performing the processing shown in FIG. 28, the MFP 300 can extend the communication period of the BLE mode to continue communication in the BLE mode, as needed, while sending the beacon in the BLE mode at the predetermined period. After the end of communication in the BLE mode, the MFP 300 distributes the predetermined period corresponding to the beacon period as the communication periods of the wireless infrastructure mode and the P2P mode in accordance with the operation state of the self-apparatus. This makes it possible to perform communication by switching the communication mode by appropriate time distribution according to the operation state of the MFP 300 while surely performing BLE communication. Note that it is possible to prevent the period, during which the BLE mode does not end, from being unnecessarily prolonged by executing, for example, a handover so as to suppress occurrence of communication in the BLE mode, as shown in FIG. 25. This can prevent the communication periods of the wireless infrastructure mode and the P2P mode from being unnecessarily shortened by extension of the communication period of the BLE mode. Thus, it is possible to sufficiently ensure the communication period allocated to WLAN communication which requires throughput while maintaining periodic transmission of the BLE beacon.

As described above, the MFP 300 according to this embodiment can set, based on the operation state, a communication period of an appropriate length with respect to each of the BLE mode and the wireless infrastructure mode and P2P mode whose communication standards are different from that of BLE. For example, the MFP 300 determines the operation state of the self-apparatus, and specifies, using a determination result, the priority level and time-division occupancy of each communication mode (with reference to, for example, the wireless control setting table prepared in advance). Then, based on the specified priority level and time-division occupancy, the MFP 300 distributes, to the plurality of communication modes, the period corresponding to the transmission period of the BLE beacon, and sets the communication periods of the respective communication modes. This can allocate the communication period to each of the communication mode of periodically communicating a predetermined signal and a communication mode requiring throughput by appropriate distribution.

In each of the above-described embodiments, a mode in which communication is executed in accordance with the wireless LAN or Bluetooth standard has been described as an example of a communication mode used. However, each communication apparatus may be configured to use the communication mode in accordance with another wireless communication standard. For example, if it is possible to add/change the wireless LAN standard or use a new wireless communication standard, the above-described argument is applicable using the added/changed standard or the new wireless communication standard. Note that in the above-described example, a period allocated to communication in each of the BLE mode, wireless infrastructure mode, and P2P mode is set in a period defined in accordance with the BLE beacon transmission period but the present invention is not limited to this. For example, a communication period may be allocated in a unit of a predetermined period regardless of the beacon transmission period. If a predetermined signal is periodically transmitted in accordance with a standard other than the BLE standard, a period corresponding to the transmission period of the predetermined signal may be set as the predetermined period used as an allocation unit. Furthermore, the 2.4- and 5-GHz bands have been exemplified as examples of the frequency band used but the present invention is not limited to them. For example, if a new frequency band becomes usable by adding/changing the wireless communication standard, the above-described argument is also applicable.

Note that in the above-described example, it is determined to use the Standby table or use the wireless infrastructure connection priority table or P2P connection priority table depending on whether data concerning the Print/Scan operation is transmitted in the wireless infrastructure mode or the P2P mode. However, the present invention is not limited to this, and for example, a table to be used may be determined depending on whether predetermined data assumed to be large in size is transmitted. That is, if predetermined data assumed to be large in size is transmitted, and then if the predetermined data is transmitted in the wireless infrastructure mode, it is determined to use the wireless infrastructure connection priority table. If the predetermined data is transmitted in the P2P mode, it is determined to use the P2P connection priority table. In the above-described example, since the frequency band and frequency channel to be used are determined uniquely with respect to BLE, these are not used as the operation state of the MFP 300. However, for example, a communication apparatus in which BLE is not used may use, as the operation state of the communication apparatus, information of the frequency bands and frequency channels for all the communication modes. That is, the communication apparatus that can operate in a plurality of modes can use, as an operation state, the frequency band and frequency channel used for at least some of the plurality of modes.

In the above-described example, the table shown in each of FIGS. 15A to 23C includes the priority level but need not include it. In this case, for example, if the MFP 300 receives, during a communication period of a given mode, a packet via communication in another mode, it determines whether the packet includes a DFS command. Then, if it is determined that the packet includes a DFS command, the MFP 300 can preferentially execute processing based on the DFS command received via communication in the other mode. Furthermore, in the above-described example, processing using the extension flag of the BLE communication period is performed in FIG. 28 but the processing shown in FIG. 28 may be performed without using the flag. For example, if YES is determined in step S2804, the MFP 300 extends the BLE communication period. Then, if a timing of transmitting the next beacon comes in a state in which the packet received in step S2806 does not include a command indicating the end of BLE communication, the MFP 300 executes the processing from step S2801. If YES is determined in step S2804, the MFP 300 extends the BLE communication period. Then, if the packet received in step S2806 includes the command indicating the end of BLE communication, the MFP 300 may end the extended BLE communication period, and execute the processes in step S2810 and the subsequent steps.

According to the present invention, it is possible to improve convenience in a communication apparatus that can execute wireless communication operations in a plurality of communication modes concurrently.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
at least one memory and at least one processor which function as:
a communication control unit configured to perform control of communication by switching a plurality of communication modes including a first communication mode, a second communication mode, and a third communication mode in a time-division manner, wherein the third communication mode is a communication mode in which communication is performed by Bluetooth Low Energy (BLE), and in which periodic transmission of a predetermined signal is performed; and
a setting unit configured to set a period to be allocated for communication in each of the plurality of communication modes in a predetermined period based on an operation state of the communication apparatus, wherein the predetermined period corresponds to a period at which the predetermined signal is transmitted,
wherein the setting unit
sets, in a case where the operation state of the communication apparatus is a first operation state in which data of a predetermined type is not transmitted and received, a ratio of a first period assigned for the first communication mode to a second period assigned for the second communication mode to a first ratio;
sets, in a case where the operation state of the communication apparatus is a second operation state in which data of the predetermined type is transmitted and/or received, a ratio of the first period to the second period to a second ratio in which a period assigned for a communication mode, which is one of the first communication mode and the second communication mode and in which the data of the predetermined type is transmitted and/or received, is longer than a period assigned for another one of the first communication mode and the second communication mode, compared to the first ratio; and
sets, in a case where, in the second operation state, a channel used in one communication mode of the first communication mode and the second communication mode is a Dynamic Frequency Selection (DFS) channel, a first period assigned for the one communication mode to satisfy a DFS operation regardless of the second ratio within a remaining period that is determined by excepting a second period assigned for the third communication mode from the predetermined period, and a period determined by excepting the first period and the second period from the predetermined period as a third period assigned for another one communication mode of the first communication mode and the second communication mode.

2. The communication apparatus according to claim 1, wherein the setting unit performs setting based on the operation state of the communication apparatus, and on a frequency band and a frequency channel used for at least some of the plurality of communication modes.

3. The communication apparatus according to claim 1, wherein the first ratio is 1:1.

4. The communication apparatus according to claim 1, wherein the data of the predetermined type is one of print data and scan data.

5. The communication apparatus according to claim 1, wherein the setting unit allocates, for communication in the third communication mode, a period corresponding to the period at which the predetermined signal is transmitted.

6. The communication apparatus according to claim 1, wherein one of an infrastructure mode and a peer-to-peer mode in a wireless LAN complying with an IEEE802.11 standard series is the first communication mode, and another one of the infrastructure mode and the peer-to-peer mode is the second communication mode.

7. The communication apparatus according to claim 1, wherein the communication control unit can concurrently maintain wireless connection in an infrastructure mode for allowing wireless communication with a communication partner apparatus via an external access point, wireless connection in a peer-to-peer mode for allowing the communication apparatus to function as a master station without intervention of the external access point to perform wireless communication with the communication partner apparatus serving as a slave station, and wireless connection in a communication mode of a standard different from the standards of the infrastructure mode and the peer-to-peer mode.

8. The communication apparatus according to claim 1, wherein the communication control unit is configured to execute communication in the plurality of communication modes using common hardware.

9. The communication apparatus according to claim 1, wherein the at least one processor further functions as an execution unit configured to execute print processing based on print data.

10. The communication apparatus according to claim 9, wherein the print processing is executed by discharging ink based on the print data.

11. A control method executed by a communication apparatus for performing control of communication by switching a plurality of communication modes including a first communication mode, a second communication mode, and a third communication mode in a time-division manner, wherein the third communication mode is a communication mode in which communication is performed by Bluetooth Low Energy (BLE), and in which periodic transmission of a predetermined signal is performed, comprising:

setting a period to be allocated for communication in each of the plurality of communication modes in a predetermined period based on an operation state of the communication apparatus, wherein the predetermined period corresponds to a period at which the predetermined signal is transmitted, wherein in the setting, in a case where the operation state of the communication apparatus is a first operation state in which data of a predetermined type is not transmitted and received, a ratio of a first period assigned for the first communication mode to a second period assigned for the second communication mode is set to a first ratio;

in a case where the operation state of the communication apparatus is a second operation state in which data of the predetermined type is transmitted and/or received, a ratio of the first period to the second period is set to a second ratio in which a period assigned for a communication mode, which is one of the first communication mode and the second communication mode and in which the data of the predetermined type is transmitted and/or received, is longer than a period assigned for another one of the first communication mode and the second communication mode, compared to the first ratio; and in a case where, in the second operation state, a channel used in one communication mode of the first communication mode and the second communication mode is a Dynamic Frequency Selection (DFS) channel, a first period assigned for the one communication mode is set to satisfy a DFS operation regardless of the second ratio within a remaining period that is determined by excepting a second period assigned for the third communication mode from the predetermined period, and a period determined by excepting the first period and the second period from the predetermined period is set as a third period assigned for another one communication mode of the first communication mode and the second communication mode.

12. A non-transitory computer-readable storage medium that stores a program for causing a computer, provided in a communication apparatus for performing control of communication by switching a plurality of communication modes including a first communication mode, a second communication mode, and a third communication mode in a time-division manner, wherein the third communication mode is a communication mode in which communication is performed by Bluetooth Low Energy (BLE), and in which periodic transmission of a predetermined signal is performed, to execute a method including:

setting a period to be allocated for communication in each of the plurality of communication modes in a predetermined period based on an operation state of the communication apparatus, wherein the predetermined period corresponds to a period at which the predetermined signal is transmitted, wherein in the setting, in a case where the operation state of the communication apparatus is a first operation state in which data of a predetermined type is not transmitted and received, a ratio of a first period assigned for the first communication mode to a second period assigned for the second communication mode is set to a first ratio;

in a case where the operation state of the communication apparatus is a second operation state in which data of the predetermined type is transmitted and/or received, a ratio of the first period to the second period is set to a second ratio in which a period assigned for a communication mode, which is one of the first communication mode and the second communication mode and in which the data of the predetermined type is transmitted and/or received, is longer than a period assigned for another one of the first communication mode and the second communication mode, compared to the first ratio; and in a case where, in the second operation state, a channel used in one communication mode of the first communication mode and the second communication mode is a Dynamic Frequency Selection (DFS) channel, a first period assigned for the one communication mode is set to satisfy a DFS operation regardless of the second ratio within a remaining period that is determined by excepting a second period assigned for the third communication mode from the predetermined period, and a period determined by excepting the first period and the second period from the predetermined period is set as a third period assigned for another one communication mode of the first communication mode and the second communication mode.

* * * * *